(12) United States Patent
Narita et al.

(10) Patent No.: US 11,943,685 B2
(45) Date of Patent: Mar. 26, 2024

(54) SERVER SYSTEM

(71) Applicant: BROTHER KOGYO KABUSHIKI KAISHA, Nagoya (JP)

(72) Inventors: Yuki Narita, Nagoya (JP); Masashi Takeichi, Gifu (JP); Koichi Hayashi, Nagoya (JP); Tomohiro Inagaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/053,594

(22) Filed: Nov. 8, 2022

(65) Prior Publication Data

US 2023/0164213 A1    May 25, 2023

(30) Foreign Application Priority Data

Nov. 22, 2021   (JP) ................................ 2021-189190

(51) Int. Cl.
*H04W 4/18*       (2009.01)
*H04L 43/10*      (2022.01)
(Continued)

(52) U.S. Cl.
CPC .............. *H04W 4/18* (2013.01); *H04L 43/10* (2013.01); *H04L 67/1014* (2013.01); *H04L 67/1036* (2013.01); *H04L 12/6418* (2013.01)

(58) Field of Classification Search
CPC ........ H04W 4/18; H04W 4/50; H04L 45/586; H04L 43/10; H04L 43/0817
See application file for complete search history.

(56) References Cited

U.S. PATENT DOCUMENTS 9,871,712 B1 *  1/2018  Sorenson, III .......... H04L 43/10
2013/0339516 A1 * 12/2013  Chauhan ................. H04W 4/18
                                                      709/224
(Continued)

FOREIGN PATENT DOCUMENTS

EP         3146696 A1      3/2017
EP         3525422 A1      8/2019
(Continued)

OTHER PUBLICATIONS

X reference: Chauhan (EP 3 146 696 B1) FD Jan. 5, 2015.*

(Continued)

*Primary Examiner* — Kyung H Shin
(74) *Attorney, Agent, or Firm* — Baker Botts L.L.P.

(57)  ABSTRACT

A server system for an always-on connection includes: a plurality of always-on connection processing parts; and a controller. Each of the always-on connection processing parts includes a plurality of always-on connection execution parts, and the controller is configured to execute: a receiving process to receive a first request for the always-on connection from a terminal device; a determining process to determine a target always-on connection processing part, among the always-on connection processing parts according to the first request, the target always-on connection processing part being one always-on connection processing part to establish the always-on connection with the terminal device; and a sending process to send to the terminal device a destination data indicating a destination of the second request for the always-on connection after determining the target always-on connection processing part, the destination data also indicating the target always-on connection processing part.

10 Claims, 12 Drawing Sheets

(51) Int. Cl.
*H04L 67/1014* (2022.01)
*H04L 67/1036* (2022.01)
*H04L 12/64* (2006.01)

(56) References Cited

U.S. PATENT DOCUMENTS

2015/0149524 A1    5/2015   Nishikawa et al.
2019/0028536 A1*   1/2019   Chauhan ............. H04L 12/6418

FOREIGN PATENT DOCUMENTS

JP       2015-133048 A    7/2015
WO     2015/179106 A1    11/2015

OTHER PUBLICATIONS

European Patent Office, Extended European Search Report issued in European Patent Application No. 22205998.2, dated Feb. 28, 2023.

* cited by examiner

FIG. 2

| CLUSTER IDENTIFIER | LABEL INFORMATION | | 301 |
| --- | --- | --- | --- |
| | AREA ITEM GG | MODEL ITEM GJ | |
| C1 | GG1 | GJ1 | |
| C2 | GG1 | GJ2 | |
| C3 | GG2 | GJ1 | |
| C4 | GG2 | GJ2 | |
| ⋮ | ⋮ | ⋮ | |

FIG. 8

| INFORMATION TYPE | ITEM | ACQUIRING METHOD | RULE FOR DETERMINING LABEL INFORMATION TO BE ASSIGNED TO CLUSTER |
|---|---|---|---|
| SERVICE INFORMATION | (GA) REGISTRATION SERVICE<br>e.g.<br>(GA1) REMOTE RINTING<br>(GA2) REMOTE SCANNING<br>(GA3) INFORMATION ACQUIRING | FROM SERVICE SERVER | (RA1) ALLOCATE SPECIFIC SERVICE TO A PLURALITY OF CLUSTERS |
| | | | (RA2) ALLOCATE DIFFERENT CLUSTER TO EACH SERVICE |
| | (GB) PRINTING FREQUENCY<br>e.g.<br>(GB1) NP ≥ NPth<br>(GB2) NP < NPth | FROM SERVICE SERVER | (RB1) ALLOCATE FIRST GROUP GB1 TO A PLURALITY OF CLUSTERS |
| | | | (RB2) ALLOCATE DIFFERENT CLUSTER TO EACH GROUP |
| HISTORY INFORMATION | (GC) COMMUNICATION FREQUENCY<br>e.g.<br>(GC1) F1 ≥ F1th<br>(GC2) F1 < F1th | FROM CONTROL SERVER | (RC1) ALLOCATE EACH GROUP TO A PLURALITY OF CLUSTERS SO THAT BIAS IN USAGE FREQUENCY F1 IS MINIMIZED |
| | | | (RC2) ALLOCATE DIFFERENT CLUSTER TO EACH GROUP |

FIG. 9

| INFORMATION TYPE | ITEM | ACQUIRING METHOD | RULE FOR DETERMINING CLUSTER LABEL INFORMATION |
|---|---|---|---|
| HISTORY INFORMATION | (GD) ERROR FREQUENCY<br>e.g.<br>(GD1) FE ≥ FEth<br>(GD2) FE < FEth | FROM CONTROL SERVER | (RD1) ALLOCATE FIRST GROUP GD1 TO SPECIFIC CLUSTER |
| | (GE) ADDRESS GROUP OF ALTOGETHER BREAKING IN THE PAST<br>e.g.<br>(GE1) IN GROUP<br>(GE2) OUT OF GROUP | FROM CONTROL SERVER | (RE1) ALLOCATE FIRST GROUP GE1 TO A PLURALITY OF CLUSTERS |
| | (GF) GROUP OF COMMUNICATION FAILURE IN THE PAST<br>e.g.<br>(GF1) IN GROUP<br>(GF2) OUT OF GROUP | FROM CONTROL SERVER | (RF1) ALLOCATE FIRST GROUP GF1 TO A PLURALITY OF CLUSTERS |
| | | | (RF2) ALLOCATE DIFFERENT CLUSTER TO EACH GROUP |
| CONNECTION SOURCE INFORMATION | (GG) CONNECTION SOURCE<br>e.g.<br>(GG1) FIRST AREA<br>(GG2) SECOND AREA<br>(GG3) THIRD AREA | FROM TERMINAL DEVICE OR CONTROL SERVER | (RG1) ALLOCATE DIFFERENT CLUSTER TO EACH AREA |

FIG. 10

| INFORMATION TYPE | ITEM | ACQUIRING METHOD | RULE FOR DETERMINING CLUSTER LABEL INFORMATION |
|---|---|---|---|
| USER INFORMATION | (GH) USER<br>e.g.<br>(GH1) FIRST USER<br>(GH2) SECOND USER<br>⋮ | FROM CONTROL SERVER | (RH1) ALLOCATE ONE CLUSTER TO EACH USER |
| | | | (RH2) ALLOCATE A PLURALITY OF CLUSTERS TO EACH USER AND ROUND ROBIN |
| | (GI) USAGE FREQUENCY F3 FOR EACH USER<br>e.g.<br>(GI1) F3 ≥ F3th<br>(GI2) F3 < F3th | FROM SERVICE SERVER | (RI1) ALLOCATE FIRST GROUP GI1 TO SPECIFIC CLUSTER |
| TERMINAL SPECIFICATION INFORMATION | (GJ) PRODUCT MODEL<br>e.g.<br>(GJ1) FIRST MODEL<br>(GJ2) SECOND MODEL<br>⋮ | FROM TERMINAL DEVICE | (RJ1) ALLOCATE CLUSTER TO EACH MODEL |
| | (GK) FIRMWARE VERSION<br>e.g.<br>(GK1) Ver. 1<br>(GK1) Ver. 2<br>⋮ | FROM TERMINAL DEVICE | (RK1) ALLOCATE CLUSTER TO EACH VERSION |

SERVER SYSTEM

REFERENCE TO RELATED APPLICATIONS

This application claims priority from Japanese Patent Application No. 2021-189190 filed on Nov. 22, 2021. The entire content of the priority application is incorporated herein by reference.

BACKGROUND ART

Conventionally, servers are used for always-on connection on networks. Further, in order to raise the usability of a network system, a redundant measure may be taken for each part of the network system. Provided that the network system is provided with a plurality of servers for the always-on connection, a technique is proposed for clients to start the always-on connection with the servers for the always-on connection corresponding to a service on the basis of a list related to the servers for the always-on connection.

DESCRIPTION

However, if the server system is provided with a plurality of processing parts for establishing the always-on connection with terminal devices, then it is not easy to use the server system to appropriately establish the always-on connection, so that there is still room left for improvement.

The present specification discloses a technique capable of establishing the always-on connection appropriately.

According to an aspect of the present teaching, there is provided a server system for an always-on connection, including:
a plurality of always-on connection processing parts; and
a controller,
wherein each of the always-on connection processing parts includes a plurality of always-on connection execution parts,
the controller is configured to execute:
a receiving process to receive a first request for the always-on connection from a terminal device;
a determining process to determine a target always-on connection processing part, among the always-on connection processing parts according to the first request, the target always-on connection processing part being one always-on connection processing part to establish the always-on connection with the terminal device; and
a sending process to send to the terminal device a destination data indicating a destination of the second request for the always-on connection after determining the target always-on connection processing part, the destination data also indicating the target always-on connection processing part, and
the target always-on connection processing part is configured to establish the always-on connection between the terminal device and one always-on connection execution part among the always-on connection execution parts included in the target always-on connection processing part, according to the second request from the terminal device.

According to the above configuration, the controller of the server system determines the target always-on connection processing part in order to establish the always-on connection according to the first request from the terminal device. Therefore, the server system including a plurality of always-on connection processing parts can establish the always-on connection appropriately with the terminal device.

Note that the technique disclosed in the present specification is realizable in various forms such as, for example, in the form of a server system based on a method for establishing the always-on connection and for the purpose of always-on connection, a computer program for realizing the method or the function of a device therefor, a recording medium (such as a non-temporary recording medium) having recorded the computer program, or the like.

FIG. 2 is a schematic diagram depicting an example of cluster label data.

FIG. 8 is a schematic diagram depicting another embodiment of label information.

FIG. 9 is another schematic diagram depicting the other embodiment of the label information.

FIG. 10 is still another schematic diagram depicting the other embodiment of the label information.

Figure 11A:
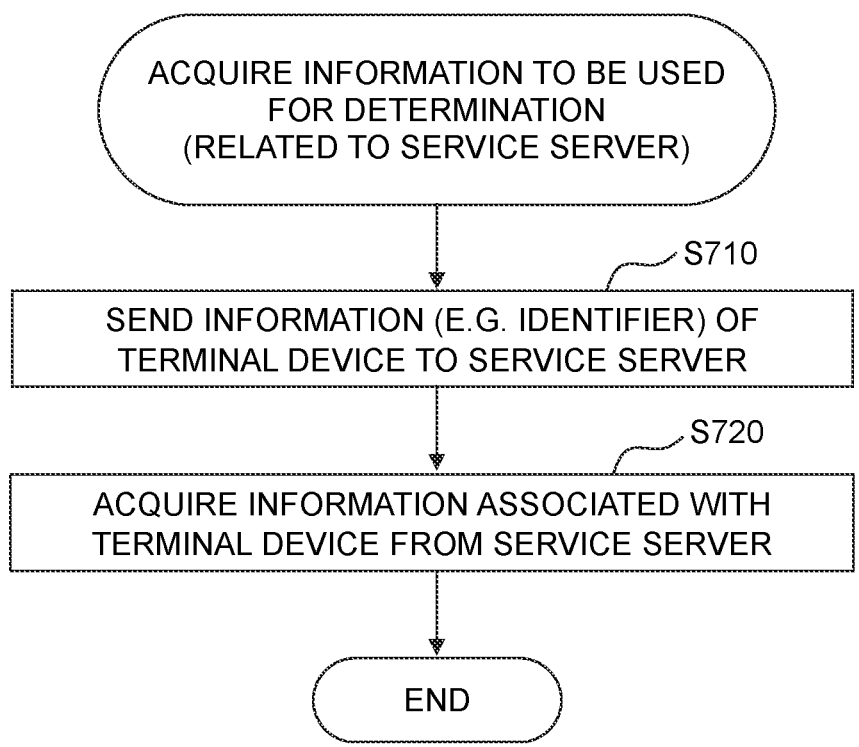

FIGS. 11A and B are flow charts depicting an example of acquirement process.

Figure 12:
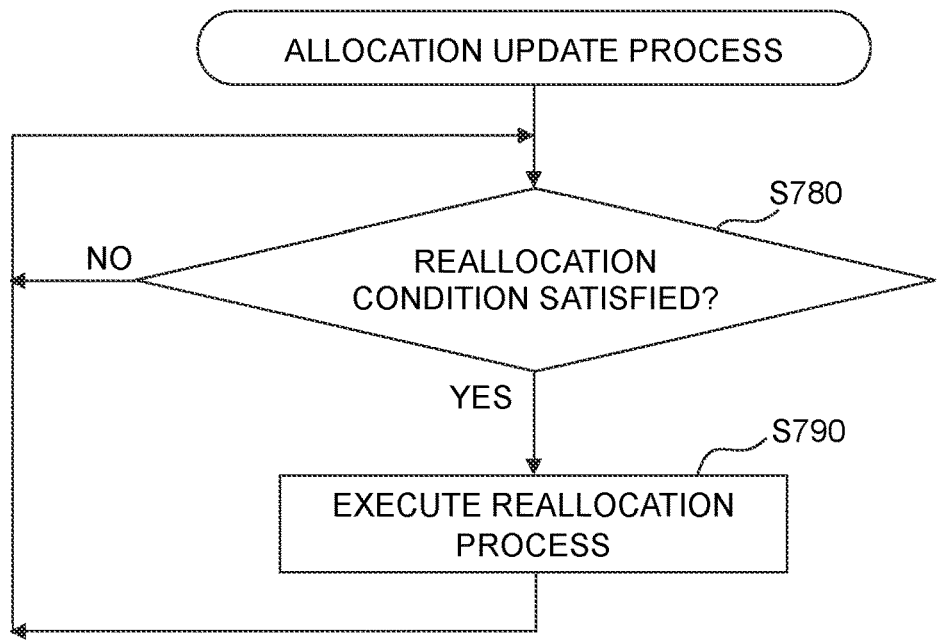

FIG. 12 is a flow chart depicting an example of allocation update process.

Figure 13:
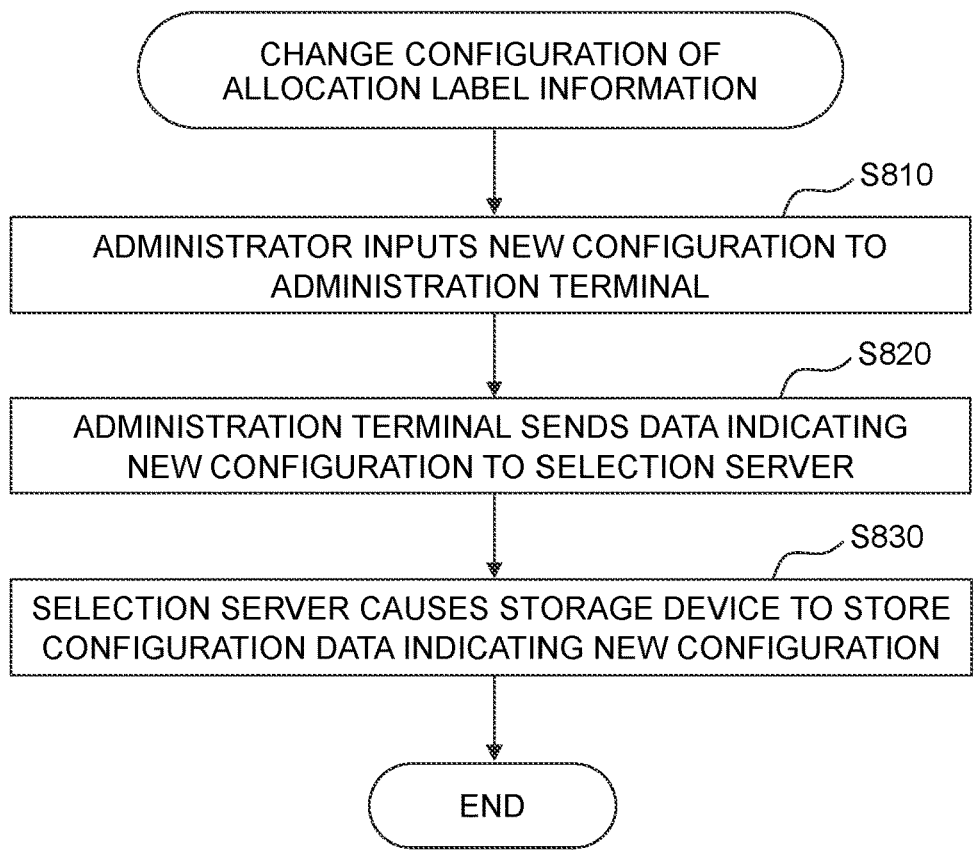

FIG. 13 is a flow chart depicting an example of processing for changing the configuration of the allocation label information.

A. First Embodiment

Figure 1:
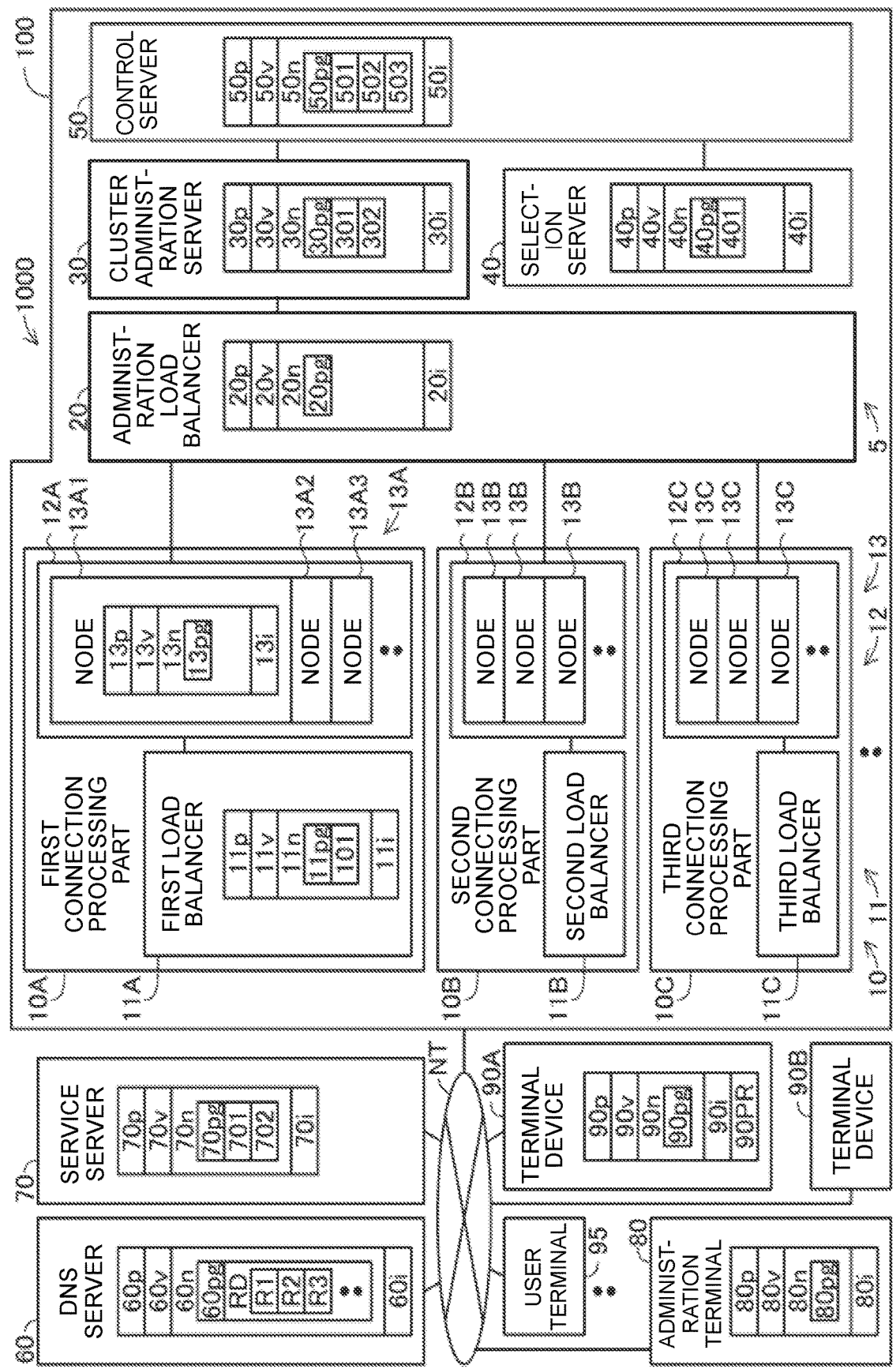
FIG. 1 is a schematic diagram depicting an embodiment of a server system.

A1. System Configuration:

FIG. 1 is a schematic diagram depicting an embodiment of a server system. This system 1000 includes a DNS server 60, a service server 70, an administration terminal 80, a plurality of terminal devices 90A and 90B, a user terminal 95, and a server system 100. These devices 60, 70, 80, 90A, 90B, 95, and 100 are connected to a network NT. The network NT may include the Internet. Further, the network NT may include local networks.

In the first embodiment, the first terminal device 90A is a printer having a printing execution part 90PR. Illustration being omitted, the second terminal device 90B has the same hardware configuration as the first terminal device 90A. The service server 70 provides various services for using the plurality of terminal devices including the terminal devices 90A and 90B via the network NT. For example, the service server 70 causes the first terminal device 90A to print images according to a request from the user terminal 95 (such a service is also referred to as remote printing). The server system 100 carries out various processes for always-on connection between the service server 70 and the plurality of terminal devices 90A and 90B.

The server system 100 has a plurality of always-on connection processing parts 10A, 10B, and 10C, an administration load balancer 20, a cluster administration server 30, a selection server 40, and a control server 50. The always-on connection processing parts 10A, 10B, and 10C establish the always-on connection with a terminal device (such as the first terminal device 90A), respectively (the always-on connection processing parts 10A, 10B, and 10C will also be simply referred below as connection processing parts 10A, 10B, and 10C). As will be described later on, the connection processing parts 10A, 10B, and 10C have, respectively, node clusters 12A, 12B, and 12C each having a plurality of nodes constructed in order to establish the always-on connection. The cluster administration server 30 carries out a process to allocate a node cluster to a terminal device. The administration load balancer 20 disperses the communication load on a plurality of node clusters by distributing the communication between the cluster administration server 30 and the node clusters to the node cluster of a communication target. The selection server 40 selects allocation label information to be assigned to the terminal device. As will be described later on, the label information is allocated in advance to each of the node clusters 12A, 12B, and 12C. Then, the terminal device is allocated with the node cluster having the label information suitable for the allocation label information for the terminal device. The control server 50 controls the server system 100.

The first connection processing part 10A has a first load balancer 11A and a node cluster 12A. The node cluster 12A has a plurality of nodes (including nodes 13A1 to 13A3). The plurality of nodes have the same hardware configuration. Hereinbelow, if there is no need to distinguish the individual nodes of the first node cluster 12A, then those respective nodes will also be referred to as nodes 13A.

In the first embodiment, the nodes 13A establish the always-on connection with the terminal device (such as the first terminal device 90A) (the nodes 13A are an example of the always-on connection execution part). Various methods are adoptable for establishing the always-on connection. In the first embodiment, the nodes 13A establish a communication session for the always-on connection according to XMPP (Extensible Messaging and Presence Protocol). The service server 70 can communicate with the terminal device by using the nodes 13A. The first load balancer 11A disperses the load of the always-on connection on the plurality of nodes 13A by distributing the always-on connection with a plurality of terminal devices to the plurality of nodes 13A.

Likewise, the other connection processing parts 10B and 10C have load balancers 11B and 11C, and node clusters 12B and 12C, respectively. The load balancers 11B and 11C each have the same hardware configuration as the first load balancer 11A. The second node cluster 12B has a plurality of nodes 13B, and the third node cluster 12C has a plurality of nodes 13C. The nodes 13B and 13C each have the same hardware configuration as the node 13A. Note that the server system 100 may include more than three connection processing parts. Hereinbelow, if there is no need to distinguish the individual connection processing parts, then those respective connection processing parts will also be referred to as connection processing parts 10A. Then, those respective load balancers and the node clusters of the connection processing parts 10A will also be referred to as load balancers 11 and the node clusters 12, respectively. Those respective nodes included in the node clusters 12 will also be referred to as nodes 13. The total number of nodes 13 included in one node cluster 12 may differ between the plurality of node clusters 12.

In the first embodiment, each of the devices 11A, 13A, 20, 30, 40, 50, 60, 70, 80, and 90A has a computer. In particular, the devices 11A, 13A, 20, 30, 40, 50, 60, 70, 80, and 90A have processing parts (such as CPUs) 11$p$, 13$p$, 20$p$, 30$p$, 40$p$, 50$p$, 60$p$, 70$p$, 80$p$, and 90$p$, volatile storage devices (such as DRAMs) 11$v$, 13$v$, 20$v$, 30$v$, 40$v$, 50$v$, 60$v$, 70$v$, 80$v$, and 90$v$, nonvolatile storage devices (such as flash memories) 11$n$, 13$n$, 20$n$, 30$n$, 40$n$, 50$n$, 60$n$, 70$n$, 80$n$, and 90$n$, and communication interfaces (such as wired LAN interfaces or wireless interfaces according to IEEE 802.11) 11$i$, 13$i$, 20$i$, 30$i$, 40$i$, 50$i$, 60$i$, 70$i$, 80$i$, and 90$i$, respectively. The nonvolatile storage devices 11$n$, 13$n$, 20$n$, 30$n$, 40$n$, 50$n$, 60$n$, 70$n$, 80$n$, and 90$n$ store beforehand programs 11$pg$, 13$pg$, 20$pg$, 30$pg$, 40$pg$, 50$pg$, 60$pg$, 70$pg$, 80$pg$, and 90$pg$ for operating the corresponding devices 11, 13, 20, 30, 40, 50, 60, 70, 80, and 90. The processing parts 11$p$, 13$p$, 20$p$, 30$p$, 40$p$, 50$p$, 60$p$, 70$p$, 80$p$, and 90$p$ carry out aftermentioned various processes according to the programs 11$pg$, 13$pg$, 20$pg$, 30$pg$, 40$pg$, 50$pg$, 60$pg$, 70$pg$, 80$pg$, and 90$pg$. The program for the terminal device (for example, the program 90$pg$ for the first terminal device 90A) is an example of firmware.

The nonvolatile storage device of the load balancer 11 of the connection processing part 10 (such as the nonvolatile storage device 11$n$ of the first load balancer 11A of the first connection processing part 10A) stores dispersion data 101 indicating a corresponding relation between the terminal device and the node. The nonvolatile storage device 30$n$ of the cluster administration server 30 stores the cluster label data 301 and the cluster terminal data 302. The nonvolatile storage device 40$n$ of the selection server 40 stores allocation label configuration data 401. The nonvolatile storage device 50$n$ of the control server 50 stores API history data 501, always-on connection history data 502, and user corresponding relation data 503. Those data 101, 301, 302, 401, 501, 502, and 503 will be described in detail later on.

The nonvolatile storage device 70$n$ of the service server 70 stores service corresponding relation data 701 and history data 702. The service corresponding relation data 701 indicate a corresponding relation between a user identifier for using the service and an identifier for the terminal device used in the service. This corresponding relation is preregistered by the user, and the service corresponding relation data 701 are predetermined. The history data 702 indicate a history of using the service. Whenever the service is used, the processing part 70$p$ of the service server 70 updates the history data 702.

The DNS server 60 carries out name resolution on the network NT. The nonvolatile storage device 60$n$ of the DNS server 60 stores record data RD indicating a corresponding relation between an IP address and a domain name. The record data RD indicate a plurality of corresponding relations including corresponding relations R1 to R3. These corresponding relations R1 to R3 respectively indicate the load balancers 11A to 11C. Illustration being omitted, the record data RD also indicate a corresponding relation between the control server 50 and the service server 70.

The user terminal 95 is a terminal device operated by the user such as a smartphone, a tablet computer, a personal computer, or the like. The user can let the service server 70 carry out various processes by operating the user terminal 95.

FIG. 2 is a schematic diagram depicting an example of cluster label data 301. The cluster label data 301 indicate a corresponding relation between a cluster identifier and label information. The cluster identifier serves to identify a node cluster 12. The cluster identifier for each of a plurality of node clusters 12 is predetermined. In FIG. 2, the cluster label data 301 depict the respective corresponding relations for a plurality of cluster identifiers including four cluster identifiers C1 to C4. In the first embodiment, the label information indicates a combination of these two items: an area item GG and a model item GJ. The area item GG indicates the area where the terminal device is used (such as the destination, country, and the like for the terminal device). In FIG. 2, the area item GG is selected from a plurality of areas including a first area GG1 and a second area GG2. The model item GJ indicates the model of the terminal device. In FIG. 2, the model item GJ is selected from a plurality of models including a first model GJ1 and a second model GJ2. In this manner, in the first embodiment, each node cluster 12 is assigned beforehand with the label information for a plurality of node clusters 12 to disperse the load according to the combination of the area item GG and the model item GJ.

Figure 3:
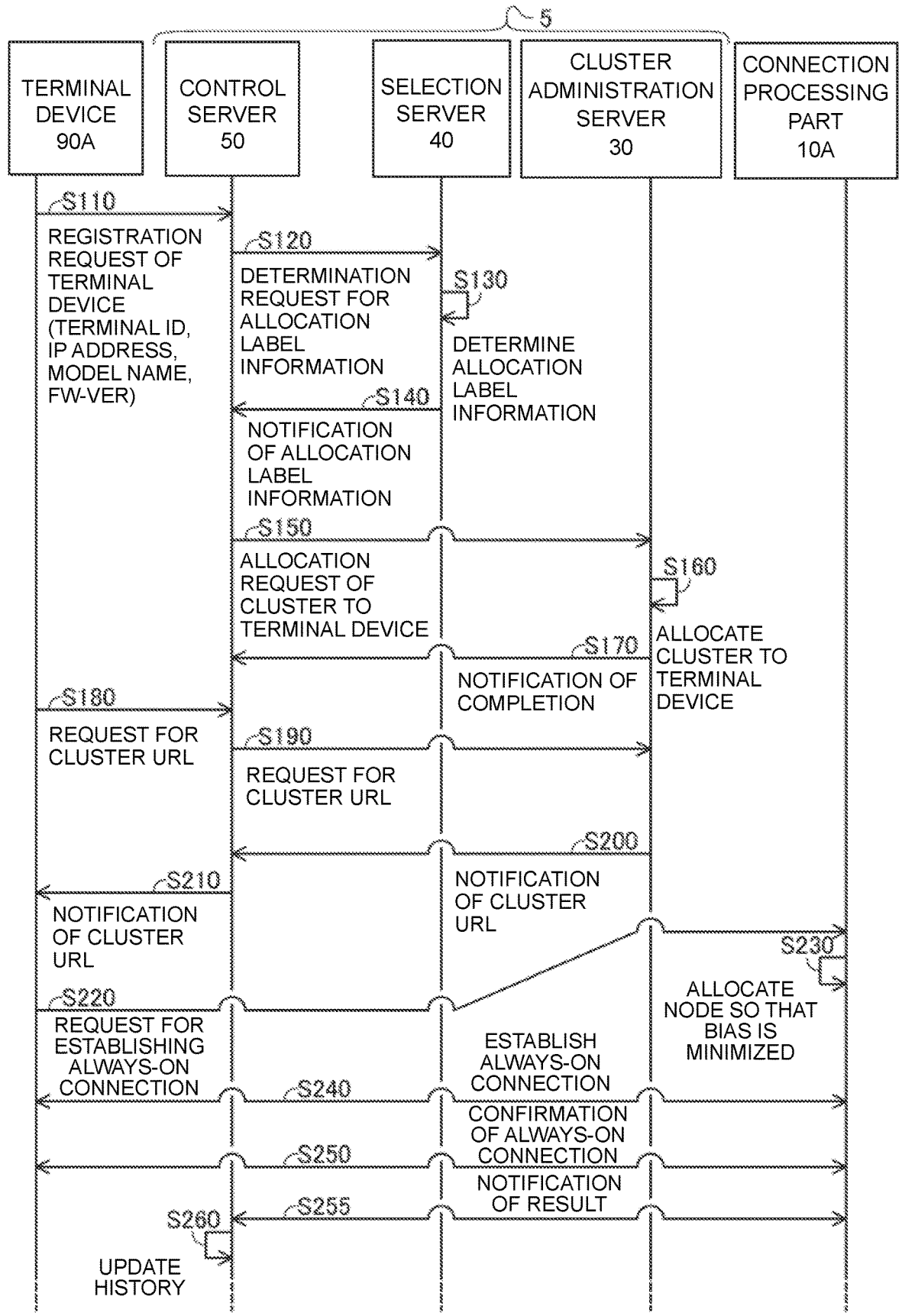
FIG. 3 is a sequence diagram depicting an example of processing for establishing an always-on connection.

A2. The Always-on Connection:

FIG. 3 is a sequence diagram depicting an example of processing for establishing an always-on connection. FIG. 3 depicts an example of processing when the first terminal device 90A establishes the always-on connection with the server system 100. The processing part 90p of the first terminal device 90A starts the processing for establishing the always-on connection according to the first terminal device 90A switching from the power off state to the power on state. Further, if the always-on connection breaks due to some communication error or the like, then the processing part 90p also starts the processing for establishing the always-on connection.

In the step S110, the processing part 90p sends a registration request of the terminal device to the control server 50. The registration request includes terminal information data with terminal information related to the first terminal device 90A. The terminal information may include any information related to the first terminal device 90A (for example, the identifier, IP address, model name, firmware version and the like for the first terminal device 90A). In the first embodiment, the terminal information includes the identifier and model name of the first terminal device 90A. Further, in the first embodiment, the nonvolatile storage device 90n stores data indicating the terminal information in advance (not depicted). The processing part 90p can acquire the terminal information by referring to the data.

In the step S120, the processing part 50p of the control server 50 sends to the selection server 40 a determination request for the allocation label information which is the label information to be allocated to the first terminal device 90A. The determination request includes the terminal information data received in the step S110.

Figure 4:
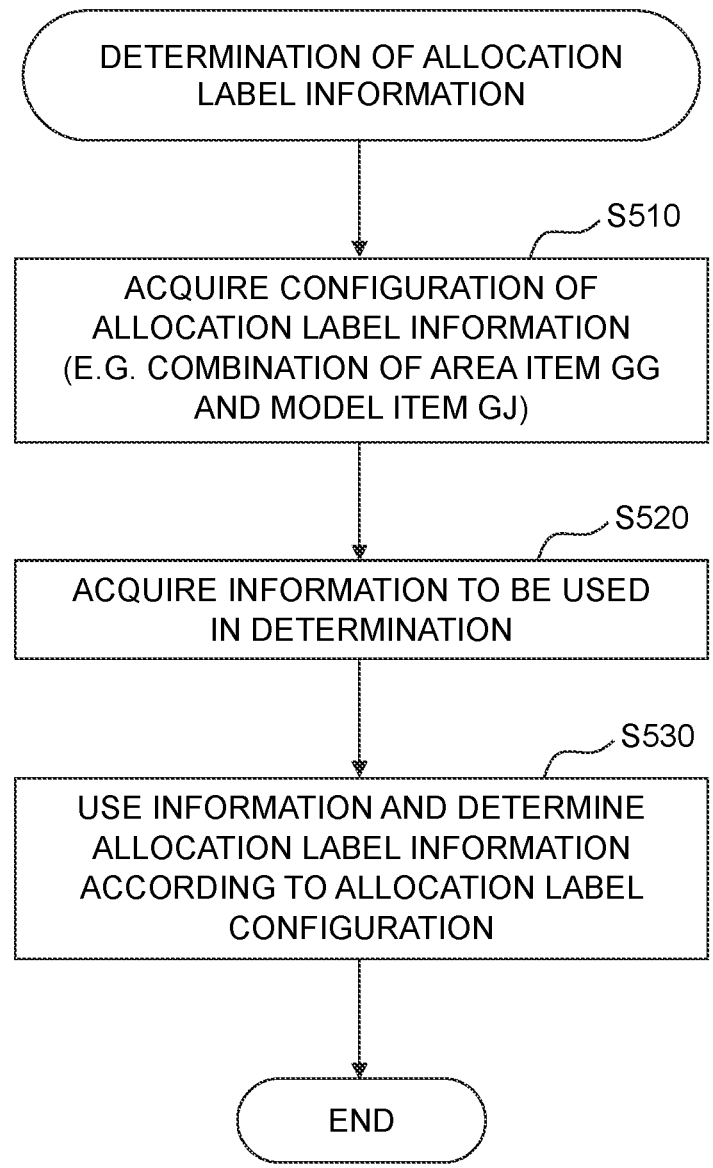
FIG. 4 is a flow chart depicting an example of processing for determining allocation label information.

In the step S130, the processing part 40p of the selection server 40 determines the allocation label information. FIG. 4 is a flow chart depicting an example of processing for determining allocation label information. In the step S510, the processing part 40p of the selection server 40 refers to the allocation label configuration data 401 (FIG. 1), and acquires an allocation label configuration which is the configuration of the allocation label information. As depicted in FIG. 2, in the first embodiment, the label information indicates the combination of the two items: the area item GG and the model item GJ. The allocation label configuration data 401 indicate that the combination of the area item GG and the model item GJ should be determined as the allocation label information.

In the step S520, the processing part 40p acquires information used in determining the allocation label information. In the first embodiment, the processing part 40p refers to the terminal information data included in the determination request received in the step S120 (FIG. 3), and acquires the information. In the first embodiment, the processing part 40p acquires the identifier and model name of the terminal device.

In the step S530, the processing part 40p uses the information acquired in the step S520, and determines the allocation label information according to the allocation label configuration. In the first embodiment, the processing part 40p uses the identifier for the first terminal device 90A to determine the area item GG of the allocation label information. For example, the area item GG is determined to be a first area GG1. A corresponding relation between the identifier and the area item GG for the terminal device is predetermined. Further, the processing part 40p uses the model name of the first terminal device 90A to determine the model item GJ of the allocation label information. For example, the model item GJ is determined to be a first model GJ1. Then, the processing part 40p ends the process of FIG. 4, that is, the step S130 of FIG. 3.

Note that for a terminal device of some specific type, in some cases, it may be preferable to disperse the node cluster 12 to be allocated on a plurality of node clusters 12, instead of allocating a specific node cluster 12. For example, if there is little shipment of the terminal devices of a specific type corresponding to a specific model name, then the node cluster 12 to be allocated to those terminal devices of the specific type may be dispersed on a plurality of node clusters 12. In the first embodiment, for the terminal devices of a specific type, the processing part 40p determines empty allocation label information without determining any particular allocation label information.

In the step S140 (FIG. 3), the processing part 40p of the selection server 40 notifies the control server 50 of the determined allocation label information. The notification includes allocation label information data of the allocation label information.

In the step S150, the processing part 50p of the control server 50 sends to the cluster administration server 30 an allocation request of the node cluster 12 to the first terminal device 90A. The allocation request includes the allocation label information data acquired in the step S140, and data indicating information about the first terminal device 90A (such as the identifier, IP address, and the like).

Figure 5:
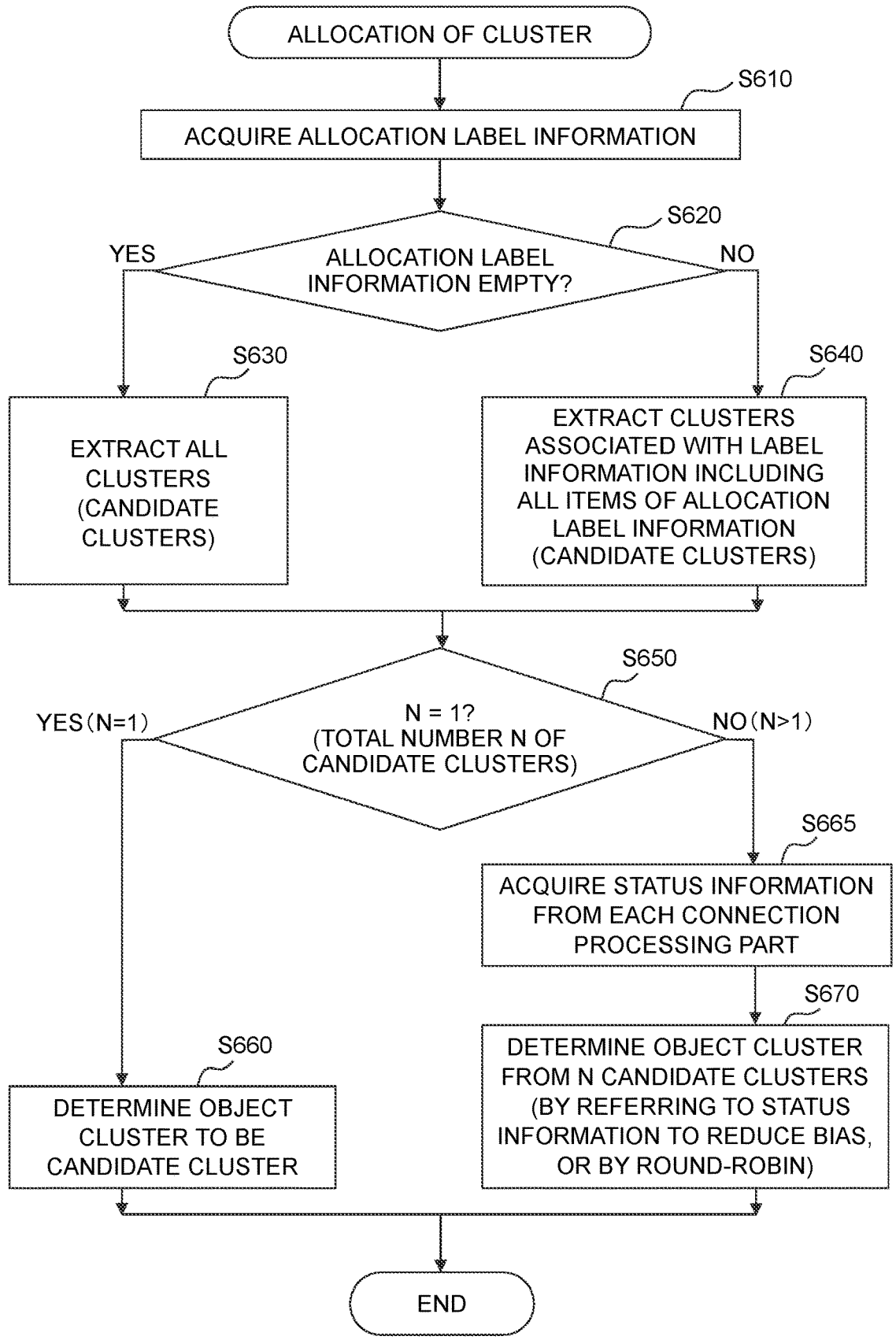
FIG. 5 is a flow chart depicting an example of processing for allocating a node cluster.

In the step S160, the processing part 30p of the cluster administration server 30 allocates the node cluster 12 to the first terminal device 90A. The node cluster 12 allocated is one node cluster 12 to establish the always-on connection with the first terminal device 90A. FIG. 5 is a flow chart depicting an example of processing for allocation of a node cluster. In the step S610, the processing part 30p acquires the allocation label information. In the first embodiment, the processing part 30p refers to the allocation label information data acquired in the step S150 (FIG. 3), and acquires the allocation label information.

In the step S620, the processing part 30p determines whether or not the allocation label information is empty. If the allocation label information is empty (S620: Yes), then in the step S630, the processing part 30p extracts all node clusters as candidate clusters, and the process shifts to the step S650.

If the allocation label information is not empty (S620: No), then in the step S640, the processing part 30p refers to the cluster label data 301 (FIG. 2), and extracts the node clusters fitting for the allocation label information as the candidate clusters. In the first embodiment, the processing part 30p extracts the node clusters assigned with the allocation label information as the candidate clusters. In particular, the processing part 30p extracts the node clusters associated with the label information including the respective options for all items of the allocation label information, as the candidate clusters. For example, if the area item GG of the allocation label information is the first area GG1 and the model item GJ is the first model GJ1, then the processing part 30*p* extracts the first cluster identifier C1 associated with the label information including the first area GG1 and the first model GJ1. After the step S640, the processing part 30*p* lets the process proceed to the step S650.

In the step S650, the processing part 30*p* determines whether or not the total number N of candidate clusters is one. If N=1 (S650: Yes), then in the step S660, the processing part 30*p* determines the candidate cluster to be the target node cluster (to be also referred to simply as target cluster) to be allocated to the terminal device. The processing part 30*p* adds to the cluster terminal data 302 (FIG. 1) the data indicating the corresponding relation between the identifier for the terminal device and the identifier for the target cluster.

Figure 6:
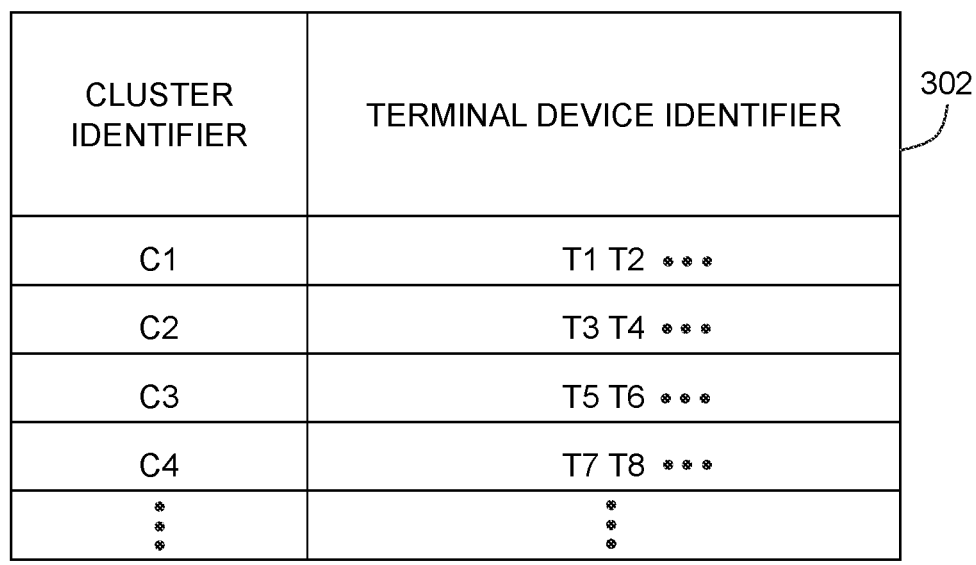
FIG. 6 is a schematic diagram depicting an example of cluster terminal data.

FIG. 6 is a schematic diagram depicting an example of cluster terminal data 302. The cluster terminal data 302 indicate a corresponding relation between the cluster identifier and the terminal device identifier. In FIG. 6, the cluster terminal data 302 indicate the corresponding relation for each of a plurality of cluster identifiers including the four cluster identifiers C1 to C4. Each of a plurality of terminal device identifiers including eight terminal device identifiers T1 to T8 is associated with a certain cluster identifier. In the step S660 (FIG. 5), the processing part 30*p* adds the terminal device identifier (such as the identifier for the first terminal device 90A) indicated by the request of the step S150 (FIG. 3), to the terminal device identifiers associated with the cluster identifier for the target clusters. Then, the processing part 30*p* ends the process of FIG. 5, that is, the step S160 (FIG. 3).

If the total number N of candidate clusters is not one (FIG. 5: S650: No), then N>1 in the first embodiment. In this case, in the step S665, the processing part 30*p* acquires status information from each of the N numbers of connection processing parts 10 (FIG. 1) corresponding to the N numbers of candidate clusters. The communication between the cluster administration server 30 and the connection processing parts 10 is relayed by the administration load balancer 20. The status information serves to indicate the state of the connection processing parts 10 and, in the first embodiment, to indicate the number of always-on connections. The number of always-on connections refers to the number of established always-on connections with the connection processing parts 10. The processing part 30*p* acquires the status information from the load balancer 11 of each connection processing part 10.

In the step S670, the processing part 30*p* selects one connection processing part 10 (that is, one node cluster 12) for reducing the bias in the number of always-on connections between the N numbers of candidate clusters. For example, the processing part 30*p* selects the node cluster 12 having the minimum number of always-on connections from the N numbers of candidate clusters. Then, the processing part 30*p* determines the selected node cluster 12 to be the target cluster. In the same manner as in the step S660, the processing part 30*p* adds the data indicating the corresponding relation between the identifier of the target cluster and the identifier of the terminal device to the cluster terminal data 302 (FIG. 6). Then, the processing part 30*p* ends the process of FIG. 5, that is, the step S160 (FIG. 3).

Hereinbelow, in the process for the first terminal device 90A, let the first node cluster 12A be extracted as a candidate cluster in the step S640 of FIG. 5. Then, let the first node cluster 12A of the first connection processing part 10A be allocated to the first terminal device 90A. The allocated node cluster 12A is also referred to as the target node cluster 12A. The connection processing part 10A having the target node cluster 12A is also referred to as the target connection processing part 10A.

In the step S170 (FIG. 3), the processing part 30*p* of the cluster administration server 30 sends a notification to the control server 50 to notify the same of the completion of allocating the node cluster.

The processing part 90*p* of the first terminal device 90A sends to the control server 50 a request for the destination to access the target node cluster 12A, in the step S180 after the step S110. This request includes data indicating the identifier for the first terminal device 90A. In the first embodiment, URL (Uniform Resource Locator) is used as the destination. The destination will also be referred to below as cluster URL. Note that the timing for carrying out the step S180 may vary. For example, the processing part 90*p* may carry out the step S180 after a predetermined time has passed since the step S110. Instead of that, the processing part 50*p* of the control server 50 may send the notification of the completion of allocating the node cluster to the first terminal device 90A according to the completion notification of the step S170. Then, the processing part 90*p* of the first terminal device 90A may carry out the step S180 according to that completion notification.

In the step S190, the processing part 50*p* of the control server 50 sends a request for the cluster URL to the cluster administration server 30. This request includes data indicating the identifier for the first terminal device 90A.

In the step S200, the processing part 30*p* of the cluster administration server 30 refers to the cluster terminal data 302 (FIG. 6), and searches for the cluster identifier associated with the identifier of the first terminal device 90A. The processing part 30*p* sends to the control server 50 a notification including destination data indicating the cluster URL associated with the searched cluster identifier. In the first embodiment, the cluster identifier is associated in advance with the URL of the load balancer 11 of the connection processing part 10 having the node cluster 12 indicated by the cluster identifier. For example, if the cluster identifier indicates the first node cluster 12A (FIG. 1), then the cluster identifier is associated with the URL of the first load balancer 11A.

In the step S210, the processing part 50*p* of the control server 50 sends to the first terminal device 90A a notification including the destination data indicating the cluster URL.

In the step S220, the processing part 90*p* of the first terminal device 90A sends a request for establishing the always-on connection to the device indicated by the cluster URL. The DNS server 60 (FIG. 1) provides the IP address of the destination device (the first load balancer 11A in this case). The request for establishing the always-on connection includes data indicating information related to the first terminal device 90A (including the IP address and the identifier for the terminal device).

In the step S230, the processing part 11*p* of the first load balancer 11 of the first connection processing part 10A selects one node 13A to be allocated to the source of sending the request of establishing the always-on connection (the first terminal device 90A in this case) from the plurality of nodes 13A of the first node cluster 12A. The one node 13A is selected for reducing the bias in the load between the plurality of nodes 13A of the first node cluster 12A or in the number of always-on connections. In the first embodiment, the node 13A is selected for reducing the bias in the number of always-on connections. Hereinbelow, the selected node 13A will also be referred to as target node 13A. The processing part 11*p* of the load balancer 11A adds data indicating the corresponding relation between the terminal device and the target node to the dispersion data 101 (FIG. 1).

In the step S240, the processing part 11$p$ of the first load balancer 11A of the first connection processing part 10A supplies a request for establishing the always-on connection from the first terminal device 90A to the target node 13A of the first connection processing part 10A. The processing part 13$p$ of the target node 13A carries out processing for establishing the always-on connection by way of communication with the first terminal device 90A according to the request for establishing the always-on connection. With the above steps, the always-on connection between the target node 13A and the first terminal device 90A is established. Then, the processing for establishing the always-on connection is ended.

After establishing the always-on connection, a so-called Keep Alive communication is carried out to keep the always-on connection between the target node 13A and the first terminal device 90A (S250). For example, the processing part 13$p$ of the target node 13A sends data of Keep Alive destined for the first terminal device 90A according to a predetermined schedule (such as a predetermined time interval). The processing part 90$p$ of the first terminal device 90A sends data indicating a response destined for the target node 13A according to the received data of Keep Alive. By virtue of this, the communication session is kept between the target node 13A and the first terminal device 90A. Note that instead of the target node 13A, the processing part 90$p$ of the first terminal device 90A may send the data of Keep Alive destined for the target node 13A according to the predetermined schedule.

In the first embodiment, the load balancer 11 of the first connection processing part 10A or the node 13 sends result data indicating a result of connection confirmation by the Keep Alive communication to the control server 50 (S255). The result data indicate the identifier for the terminal device, the IP address of the terminal device, the time and date, and a flag indicating whether or not the connection confirmation is successful. The processing part 50$p$ of the control server 50 adds the result data to the always-on connection history data 502 (FIG. 1) (S260). In this manner, the always-on connection history data 502 is updated to show the history of the always-on connection of each terminal device. The steps S250 to S260 are carried out repetitively.

Note that in the first embodiment, the communication between the first terminal device 90A and the target node 13A is relayed by the first load balancer 11A. Instead of that, after the step S230, the target node 13A and the first terminal device 90A may directly communicate without the first load balancer 11A staying therebetween.

When another terminal device (such as the second terminal device 90B) establishes the always-on connection with the server system 100, in the same manner, the process of FIG. 3 is also carried out. On this occasion, the first terminal device 90A is replaced by the other terminal device, and the first connection processing part 10A is replaced by the connection processing part 10 having the node cluster 12 allocated to the terminal device in the step S160.

Figure 7:
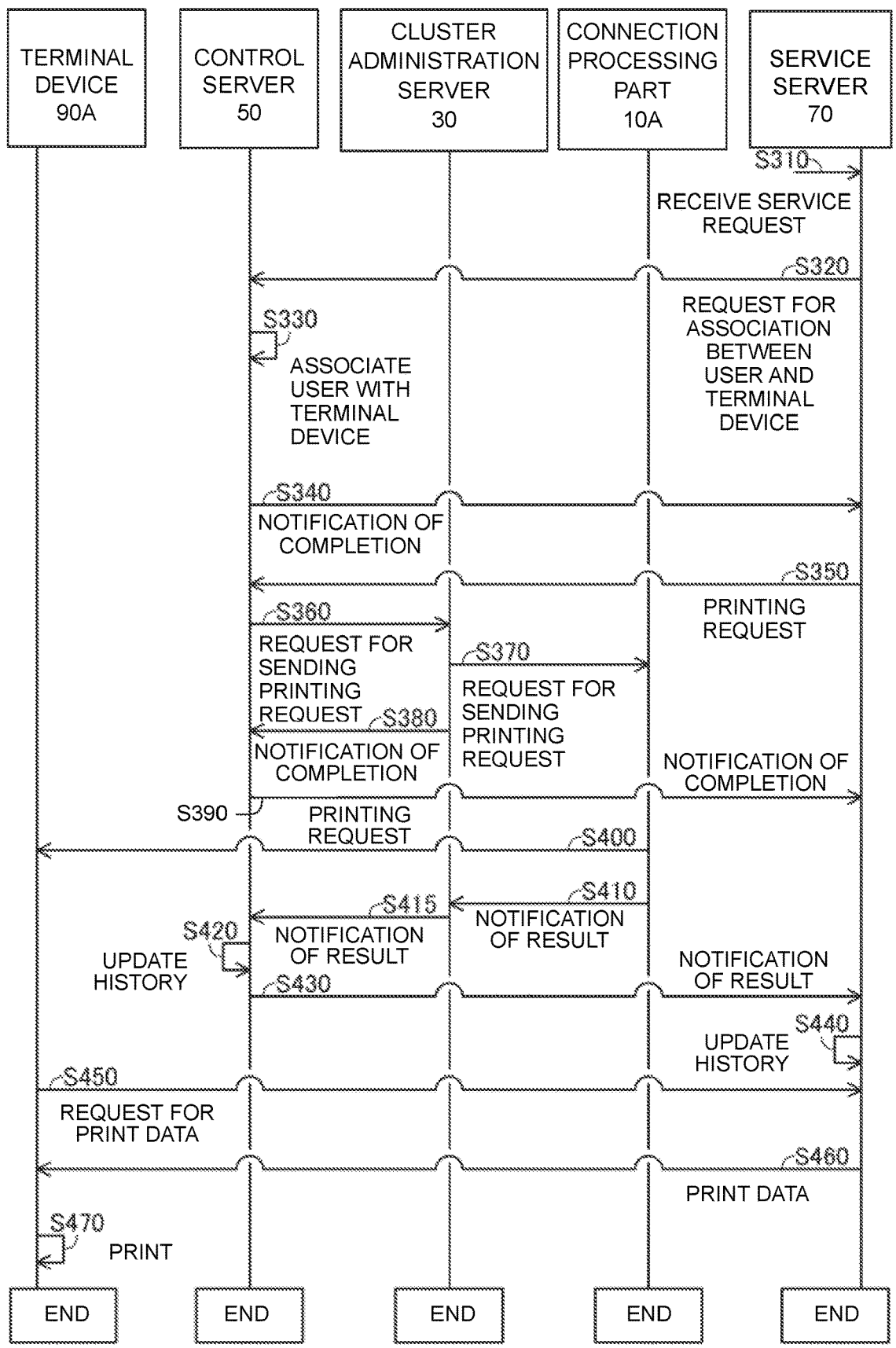
FIG. 7 is a flow chart depicting an example of processing for using a service.

A3. Service:

FIG. 7 is a flow chart depicting an example of processing for using a service with the service server 70 (FIG. 1). In the step S310, the service server 70 receives a service request from an external device such as the user terminal 95 or the like. Hereinbelow, let the service request be a request for the first terminal device 90A to print. In first embodiment, the service request includes the user identifier for using the service, data indicating that the requested service is remote printing, data indicating the identifier for the terminal device to be used in the service (the first terminal device 90A in this case), and image data for the image to be printed.

In the step S320, the processing part 70$p$ of the service server 70 sends to the control server 50 a request for association between the user identifier and the identifier for the first terminal device 90A. In the step S330, the processing part 50$p$ of the control server 50 associates the user identifier with the identifier for the first terminal device 90A, and adds data indicating this corresponding relation to the user corresponding relation data 503 (FIG. 1). In this manner, the user corresponding relation data 503 indicate the corresponding relation between the user identifier and the identifier for the terminal device. In the step S340, the processing part 50$p$ sends a completion notification to the service server 70.

In the step S350, the processing part 70$p$ of the service server 70 sends a request for printing destined for the first terminal device 90A to the control server 50. In the first embodiment, the processing part 70$p$ uses image data for the image to be printed to generate print data for the first terminal device 90A. The processing part 70$p$ lets the nonvolatile storage device 70$n$ store the print data, and generates URL of accessing the print data (to be also referred to as print URL). The request for printing includes print URL data indicating the print URL.

In the step S360, the processing part 50$p$ of the control server 50 sends to the cluster administration server 30 a request for sending the request for printing destined for the first terminal device 90A.

In the step S370, the processing part 30$p$ of the cluster administration server 30 refers to the cluster terminal data 302 (FIG. 6), and acquires the cluster identifier associated with the first terminal device 90A. The processing part 30$p$ sends a request for sending the printing request destined for the first terminal device 90A, to the load balancer 11 of the connection processing part 10 having the node cluster 12 indicated by the acquired cluster identifier (to the first load balancer 11A of the first connection processing part 10A in this case). In the step S380, the processing part 30$p$ sends a completion notification to the control server 50. In the step S390, the processing part 50$p$ sends a completion notification to the service server 70.

In the step S400, the processing part 11$p$ of the first load balancer 11A of the first connection processing part 10A refers to the dispersion data 101, and searches for the target node 13A associated with the first terminal device 90A which is the destination of the printing request. The processing part 11$p$ sends a request for sending the printing request destined for the first terminal device 90A to the searched target node 13A. The processing part 13$p$ of the target node 13A sends the printing request to the first terminal device 90A. This printing request includes print URL data.

In the step S410, the processing part 13$p$ of the target node 13A sends to the cluster administration server 30, via the administration load balancer 20, a result notification including result data indicating a result of the sent printing request. In the step S415, the processing part 30$p$ of the cluster administration server 30 sends the result notification to the control server 50. In the step S420, the processing part 50$p$ of the control server 50 updates the API history data 501. The API history data 501 indicates a history of using API (Application Programming Interface). The API for the history in question is released to the service server 70 by the server system 100 (the control server 50 in this case), including the API for making the request for service such as remote printing, remote scanning, and the like. The processing part 50p adds to the API history data 501 the data indicating, for example, the identifier of the user requesting for the service, the identifier for the terminal device, the time and date, and a flag indicating whether or not the communication is successful between the node 13 and the terminal device. In the step S430, the processing part 50p sends a result notification to the service server 70. In the step S440, the processing part 70p of the service server 70 updates the history data 702 (FIG. 1). For example, the processing part 70p adds to the history data 702 the data indicating the user identifier, the identifier for the terminal device used in the service, printed pages, the time and date, and the flag indicating whether or not the communication is successful between the node 13 and the terminal device.

In the step S450, the processing part 90p of the first terminal device 90A accesses the print URL indicated by the print URL data included in the printing request, and sends a print data request. In the first embodiment, the print URL indicates the print data stored in the nonvolatile storage device 70n of the service server 70. In the step S460, the processing part 70p of the service server 70 sends the print data to the first terminal device 90A according to the request. In the step S470, the processing part 90p of the first terminal device 90A causes the printing execution part 90PR to print images by controlling the printing execution part 90PR according to the print data. Then, the process of FIG. 7 is ended. Note that if sending the request for printing in the step S400 is not successful, then the steps S450 to S470 are omitted.

In the above manner, in the first embodiment, the server system 100 (FIG. 1) is configured to establish the always-on connection with the terminal devices 90A and 90B, and the like. The server system 100 has a plurality of connection processing parts 10, an administration load balancer 20, a cluster administration server 30, a selection server 40, and a control server 50. As explained with FIG. 3, the devices 20 to 50 share the processes for controlling the plurality of connection processing parts 10. Hereinbelow, the devices 20 to 50 will also be referred to collectively as controller 5.

Each of the connection processing parts 10 includes a node cluster 12 constructed from a plurality of nodes 13. The nodes 13 are an example of always-on connection execution parts configured to establish the always-on connection. In the step S110 (FIG. 3), the controller 5 (the control server 50 in this case) receives a registration request for the always-on connection from the first terminal device 90A (the registration request will be also referred to as first request). In the steps S120 to S160, the controller 5 (the devices 30 to 50 in this case) determines one target node cluster 12A to establish the always-on connection with the terminal device among the plurality of node clusters 12 according to the first request. The target connection processing part 10A having the target node cluster 12A is an example of the target always-on connection processing part which is one always-on connection processing part to establish the always-on connection with the first terminal device 90A. The steps S120 to S160 are an example of determination processing for determining the target connection processing part 10A to establish the always-on connection with the first terminal device 90A. In the steps S200 and S210, the controller 5 (the devices 30 and 50 in this case) sends to the first terminal device 90A the destination data indicating the target connection processing part 10A and indicating the cluster URL, after determining the target connection processing part 10A. The cluster URL is an example of destination of the request for establishment of the always-on connection. The target connection processing part 10A is configured to establish the always-on connection between the first terminal device 90A and one target node 13A among the plurality of nodes 13 included in the first connection processing part 10A (hereinbelow, the request for establishment will also be referred to as second request), according to the request for establishment from the first terminal device 90A (S220). In this manner, the controller 5 of the server system 100 determines the target connection processing part 10A to establish the always-on connection according to the first request from the first terminal device 90A. Therefore, the server system 100 having the plurality of connection processing parts 10 can establish the always-on connection appropriately with the first terminal device 90A.

In the first embodiment, in the determining process by the target connection processing part 10A (the steps S120 to S160), the controller 5 uses one piece or more of information including the model item GJ for the first terminal device 90A (the area item GG and the model item GJ (FIG. 2) in the first embodiment), to determine the target connection processing part 10A. The model item GJ is an example of terminal specification information related to the specifications of the first terminal device 90A. The controller 5 can determine the target connection processing part 10A suitable for the first terminal device 90A by using such kind of terminal specification information. For example, as depicted in FIG. 2, a first model GJ1 and a second model GJ2 are allocated with identifiers different from each other (that is, the connection processing parts 10 different from each other). In this manner, according to the model item GJ (more generally, the specification of the terminal device), it is possible to disperse the load of the always-on connection on a plurality of connection processing parts 10.

In the first embodiment, as depicted in FIG. 2, the plurality of node clusters 12 (that is, the plurality of connection processing parts 10) are each assigned with the label information. As depicted in FIG. 3, the determining process by the target connection processing part 10A (the steps S120 to S160) includes the steps S130 and S160. In the step S130, the controller 5 (the selection server 40 in this case) determines the allocation label information to be allocated to the first terminal device 90A. The step S160 includes the process of FIG. 5. As explained in FIG. 5, the controller 5 (the cluster administration server 30 in this case) determines the node cluster 12A assigned with the allocation label information to be the target cluster among the plurality of node clusters 12. That is, the cluster administration server 30 determines the first connection processing part 10A assigned with the allocation label information as the target connection processing part 10A among the plurality of connection processing parts 10. In this manner, the controller 5 determines the target connection processing part to be allocated to the terminal device via the label information. Therefore, the controller 5 can use the label information to determine a proper target connection processing part. Suppose that the controller 5 uses information of the terminal device to directly determine the target connection processing part without using the label information. Then, it is not easy to adjust the corresponding relation between the terminal device and the connection processing part (for example, the algorithm is changed for determining the target connection processing part from the information of the terminal device). In the first embodiment, it can be easy to adjust the corresponding relation between the terminal device and the connection processing part by changing the label information (FIG. 2) assigned to the node cluster 12 (that is, to the connection processing part 10).

The cluster label data 301 (FIG. 2) may associate the same label information with a plurality of cluster identifiers. For example, the cluster label data 301 may associate a combination of the first area GG1 and the first model GJ1 with a plurality of cluster identifiers. In the step S640 of FIG. 5, if the allocation label information indicates the combination of the first area GG1 and the first model GJ1, then the processing part 30p of the cluster administration server 30 extracts the plurality of node clusters 12 as a plurality of candidate clusters, associated with the combination of the first area GG1 and the first model GJ1. In this manner, the plurality of node clusters 12 may include a plurality of node clusters 12 assigned with the allocation label information. That is, the plurality of connection processing parts 10 may include a plurality of candidate processing parts being the plurality of connection processing parts assigned with the allocation label information. In the steps S665 and S670, the processing part 30p determines one target node cluster (that is, one target connection processing part) to reduce the bias in the number of always-on connections between the plurality of candidate clusters. In this manner, the server system 100 can reduce the bias in the number of always-on connections between a plurality of candidate processing parts. Therefore, there is a lower possibility of a concentrated load on some of the plurality of connection processing parts 10.

The cluster label data 301 (FIG. 2) may associate specific label information with one cluster identifier only. For example, the cluster label data 301 may associate label information indicating the combination of the first area GG1 and the first model GJ1 with the first cluster identifier C1 only (this label information will be referred to as single cluster label information). In the step S640 of FIG. 5, if the allocation label information indicates the single cluster label information, then the processing part 30p of the cluster administration server 30 extracts one cluster identifier only (for example, the first cluster identifier C1). If the allocation label information indicating the single cluster label information is allocated to a plurality of terminal devices, then the controller 5 determines the same connection processing part 10 associated with the first cluster identifier C1 as the target connection processing part, for those plurality of terminal devices. In this manner, the controller 5 may determine the same connection processing part as the target connection processing part for the plurality of terminal devices satisfying a specific condition (for example, the condition of allocating the allocation label information indicating the single cluster label information). According to this configuration, a specific connection processing part 10 suitable for a plurality of terminal devices satisfying the specific condition can establish the always-on connection with those plurality of terminal devices. For example, the node cluster 12 of the specific connection processing part 10 may be configured to have a suitable number of nodes 13 for the number of shipments of a plurality of terminal devices satisfying the specific condition.

As explained with FIG. 1, the plurality of connection processing parts 10 each have a load balancer 11. As explained for the steps S230 and S240 of FIG. 3, the load balancer 11 is configured to distribute the second condition received by the connection processing part 10 (that is, in the first embodiment, the request for establishing the always-on connection) to a plurality of nodes 13. As explained for the step S200 of FIG. 3, the destination data indicating the destination with the second request for the always-on connection indicate the load balancer 11 of the target connection processing part (the URL of the load balancer 11 in the first embodiment). Therefore, the connection processing part 10 including a load balancer 11 and a plurality of nodes 13 can establish the always-on connection appropriately with the terminal device.

B. Second Embodiment

FIGS. 8 to 10 are schematic diagrams depicting another embodiment of label information. The label information is not limited to the area item GG (FIG. 2) and the model item GJ, but can use various other items. FIGS. 8 to 10 indicate eleven times GA to GK which are an example of usable items. Each figure indicates a corresponding relation between the type of information, item, method for acquirement, and rule for determining the cluster label data 301 (FIG. 2). The items GA to GK are classified into the following five types: "service information", "history information", "connection source information", "user information", and "terminal specification information". The method for acquirement is that used in determining each item in the step S520 of FIG. 4.

As will be described later on, as the label information, the items determined on the basis of the history about the terminal devices may use used (for example, the items GB, GC, GD, GE, GF, and GI). The power source for a terminal device can be switched by the user between the off state and the on state. If the power source is switched from the off state to the on state, then the terminal device starts the process for establishing the always-on connection (FIG. 3). Further, if the always-on connection breaks due to some communication error or the like, then the terminal device also starts the process for establishing the always-on connection. On this occasion, a node cluster 12 suitable for the history related to the terminal device may be allocated to the terminal device. That, is, a node cluster 12 different from the node cluster 12 allocated in the past may be allocated to the terminal device. Hereinbelow, the items GA to GK will be explained one after another.

B1. The Service Item GA:

The service item GA (FIG. 8) indicates the contents of the service of using the terminal device. The service item GA is selected, for example, from a plurality of services including a remote printing GA1, a remote scanning GA2, and an information acquiring GA3. In the service of the remote printing GA1, the service server 70 causes the terminal device to print images via the network NT (see FIG. 7). In the service of the remote scanning GA2, the service server 70 causes the terminal device having a reader device to read out from a target (such as a document sheet or the like) and to send the readout image data to a user terminal (such as the user terminal 95) via the network NT. In the service of the information acquiring GA3, the service server 70 acquires information from the terminal device and uses the acquired information to carry out a specific process. For example, if the terminal device has a printing execution part, then the service server 70 acquires from the terminal device the residual information indicating the residual amount of office supplies (color materials (such as ink or toner), printing paper, and the like). Then, the service server 70 carries out an ordering process to place an order of the office supplies if the residual amount comes down to a threshold value or less.

In the step S520 of FIG. 4, the processing part 40p of the selection server 40 acquires information used for determining the service item GA from the service server 70. FIG. 11A is a flow chart depicting an example of acquirement process carried out in the step S520 of FIG. 4. In the step S710, the processing part 40p of the selection server 40 sends data indicating the identifier for the terminal device to the service server 70. In the step S720, the processing part 70p of the service server 70 sends to the selection server 40 the data indicating the service item GA associated in advance with the identifier for the terminal device. The processing part 40p of the selection server 40 refers to the data from the service server 70 to determine the service item GA. Note that the nonvolatile storage device 70n of the service server 70 stores beforehand the data indicating a corresponding relation between the identifier for the terminal device and the service (illustration omitted).

The rule for determining the cluster label data 301 (FIG. 2) related to the service item GA may be, for example, selected from two rules RA1 and RA2. The first rule RA1 is associated with a plurality of cluster identifiers with the specific service item GA. For example, since the remote printing GA1 and the remote scanning GA2 cannot be used under the condition of breaking of the always-on connection, it is preferable for those services to keep the always-on connection less likely to break. Therefore, the remote printing GA1 and the remote scanning GA2 may be each associated with a plurality of cluster identifiers. In such case, even if one connection processing part 10 falls into some situation of malfunction, the service server 70 can still carry out the services of the remote printing GA1 and the remote scanning GA2 for the terminal device connected to another connection processing part 10. It is also preferable for the information acquiring GA3 to be associated with a plurality of cluster identifiers. However, the service of the information acquiring GA3 may be carried out after the always-on connection is restored if the always-on connection experienced a break. Therefore, the information acquiring GA3 can be associated with one cluster identifier.

The second rule RA2 is to associate each service with a different cluster identifier. According to this configuration, influence is diminished on the other services due to some problem in the node cluster 12 caused by the load of one service.

Between the plurality of connection processing parts 10, the quality of the always-on connection may differ. In this case, according to the second rule RA2, the corresponding relation between the service and the cluster identifier may be determined as follows. The information acquiring GA3 may be associated with the cluster identifier for the connection processing part 10 providing the always-on connection of a predetermined quality. The remote printing GA1 and the remote scanning GA2 may be each associated with the cluster identifier for the connection processing part 10 providing the always-on connection of a higher quality. According to this configuration, the remote printing GA1 and the remote scanning GA2 are less likely to break such that there is a lower possibility of stopping the services. Note that one service may be associated with any number (one or more) of cluster identifiers.

Any method may be used to adjust the quality of the always-on connection. For example, illustration being omitted, the server system 100 is provided with a monitor monitoring the devices 11 and 13 included in the connection processing part 10. Further, the connection processing part 10 has a substitution device for each of the devices 11 and 13. The monitor periodically carries out a health check on each of the devices 11 and 13. If some abnormity is detected in the health check, then the monitor lets the abnormal device be replaced by a substitution device. By virtue of this, the connection processing part 10 facilitates improving the quality of the always-on connection (for example, there is shortened time of interrupting the always-on connection due to some abnormity of the device). By increasing the frequency of the health check, the quality of the always-on connection is improved. Further, by adjusting the condition for abnormity detection in the health check for detecting the abnormity in a readier manner, the quality of the always-on connection is also improved. Further, by increasing the total number of nodes 13 of the node cluster 12, the number of always-on connections is decreased per node 13. By virtue of this, the possibility of malfunction of the nodes 13 is reduced such that the quality of the always-on connection is improved. Between the plurality of connection processing parts 10, either or both of the frequency of the health check and the condition for abnormity detection may differ. Further, between the plurality of connection processing parts 10, the number of always-on connections per node 13 may differ.

B2. Printing Frequency Item GB

The printing frequency item GB (FIG. 8) indicates a group of printed pages NP per day via the remote printing. The printing frequency item GB is selected, for example, from a first group GB1 (the printed pages NP per day are equal to or more than a predetermined threshold value NPth), and a second group GB2 (the printed pages NP per day are less than the predetermined threshold value NPth).

In the step S520 of FIG. 4, the processing part 40p of the selection server 40 acquires information used to determine the printing frequency item GB from the service server 70 according to the process of FIG. 11A. In the step S710, the processing part 40p of the selection server 40 sends data indicating the identifier for the terminal device to the service server 70. In the step S720, the processing part 70p of the service server 70 refers to the history data 702, and prepares information about the printing frequency item GB from the history of the remote printing associated with the identifier for the terminal device (for example, the total printing pages, and the days from starting use of the service to the present). The processing part 70p sends data indicating the prepared information to the selection server 40. The processing part 40p of the selection server 40 refers to the data from the service server 70, calculates the printed pages NP per day, and determines the printing frequency item GB (For example, NP=the total printing pages/days).

The rule for determining the cluster label data 301 (FIG. 2) related to the printing frequency item GB may be, for example, selected from two rules RB1 and RB2. The first rule RB1 associates the first group GB1 with a plurality of cluster identifiers. The first group GB1 is a group of a high printing frequency, so that any terminal device of the first group GB1 uses the always-on connection at a high frequency. If the first group GB1 is associated with a plurality of cluster identifiers, then even in the case of one connection processing part 10 malfunctioning, the service server 70 can still carry out the remote printing with the terminal device connected to another connection processing part 10. It is also preferable to associate the second group GB2 to a plurality of cluster identifiers. However, any terminal device of the second group GB2 uses the always-on connection at a low frequency. A temporary break of the always-on connection exerts a smaller influence on the second group GB2 than that on the first group GB1. Therefore, the second group GB2 may be associated with one cluster identifier.

The second rule RB2 associates a different cluster identifier with each group of the printing frequency item GB. The second rule RB2 is a similar rule to the second rule RA2. The quality of the always-on connection may differ between the plurality of connection processing parts 10. In this case, the second group GB2 may be associated with the cluster identifier for a connection processing part 10 providing the always-on connection of a predetermined quality. The first group GB1 may be associated with the cluster identifier for a connection processing part 10 providing the always-on connection of a higher quality.

B3. Communication Frequency Item GC:

The communication frequency item GC (FIG. 8) indicates a group with an API usage frequency F1. The API of the API usage frequency F1 is an API at which communication is brought by the node 13, among the APIs released to the service server 70 by the server system 100 (the control server 50 in this case). In particular, the API of the API usage frequency F1 serves for requesting services such as the remote printing, the remote scanning, and the like. The communication frequency item GC is selected, for example, from a first group GC1 (the API usage frequency F1 is equal to or more than a predetermined threshold value F1th), and a second group GC2 (the API usage frequency F1 is less than the predetermined threshold value F1th).

Figure 11B:
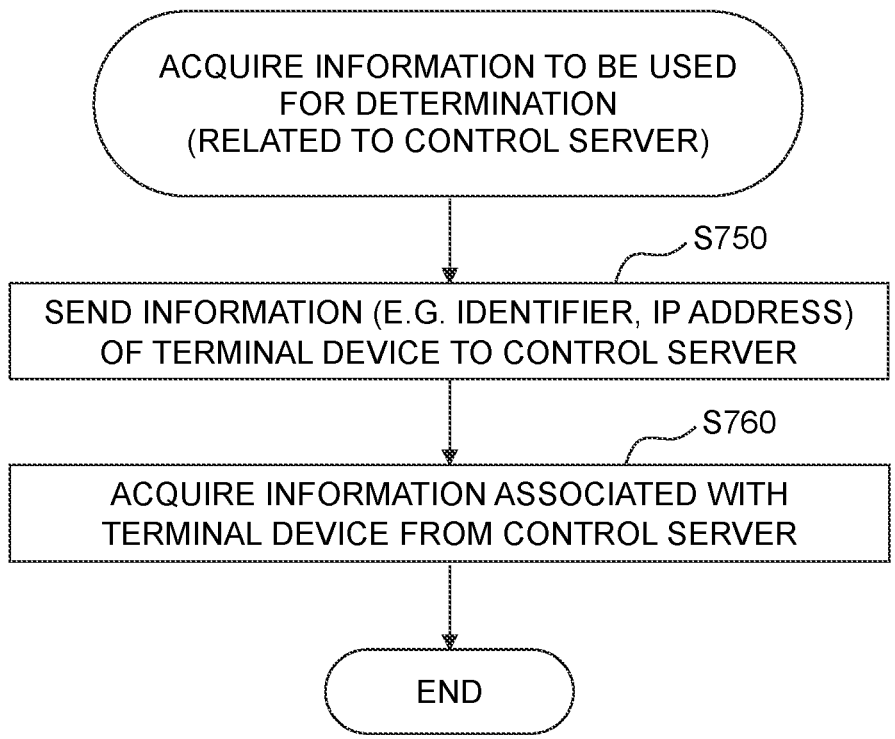

In the step S520 of FIG. 4, the processing part 40p of the selection server 40 acquires the information used to determine the communication frequency item GC from the control server 50. FIG. 11B is another flow chart depicting the example of acquirement process carried out in the step S520 of FIG. 4. In the step S750, the processing part 40p of the selection server 40 sends data indicating the identifier for the terminal device to the control server 50. In the step S760, the processing part 50p of the control server 50 refers to the API history data 501 (FIG. 1), and prepares information about the API usage frequency F1 from the history of using the API associated with the identifier for the terminal device (for example, the total number of usages, and the days from starting use of the service to the present). Then, the processing part 50p sends data indicating the prepared information to the selection server 40. The processing part 40p of the selection server 40 refers to the data from the control server 50, calculates the API usage frequency F1, and determines the communication frequency item GC (For example, F1=the total number of usages/days).

The rule for determining the cluster label data 301 (FIG. 2) related to the communication frequency item GC may be, for example, selected from two rules RC1 and RC2. The first rule RC1 associates each of the groups GCB1 and GC2 with a plurality of cluster identifiers such that bias in the API usage frequency F1 may be reduced. For example, the first group GC1 and the second group GC2 are associated with a plurality of common cluster identifiers. By virtue of this, the bias in the load is reduced between the plurality of node clusters 12.

The second rule RC2 associates a different cluster identifier with each group of the communication frequency item GC. The second rule RC2 is a similar rule to the second rule RA2. The quality of the always-on connection may differ between the plurality of connection processing parts 10. In this case, the second group GC2 may be associated with the cluster identifier for a connection processing part 10 providing the always-on connection of a predetermined quality. The first group GC1 may be associated with the cluster identifier for a connection processing part 10 providing the always-on connection of a higher quality.

B4. Error Frequency Item GD:

The error frequency item GD (FIG. 9) indicates a group with an API error frequency FE. The API of the API error frequency FE is the same as the API of the API usage frequency F1 (FIG. 8). The error frequency item GD is selected, for example, from a first group GD1 (the API error frequency FE is equal to or more than a predetermined threshold value FEth), and a second group GD2 (the API error frequency FE is less than the predetermined threshold value FEth).

In the step S520 of FIG. 4, the processing part 40p of the selection server 40 acquires the information used to determine the error frequency item GD from the control server 50, according to the process of FIG. 11B. In the step S750, the processing part 40p of the selection server 40 sends data indicating the identifier for the terminal device to the control server 50. In the step S760, the processing part 50p of the control server 50 refers to the API history data 501 (FIG. 1), and prepares information about the API error frequency FE from the history of using the API associated with the identifier for the terminal device (for example, the total number of errors, and the days from starting use of the service to the present). Then, the processing part 50p sends data indicating the prepared information to the selection server 40. The processing part 40p of the selection server 40 refers to the data from the control server 50, calculates the API error frequency FE, and determines the error frequency item GD (For example, FE=the total number of errors/days).

The rule for determining the cluster label data 301 (FIG. 2) related to the error frequency item GD may be, for example, the following rule RD1. The rule RD1 associates the first group GD1 with one specific cluster identifier or more. According to this configuration, there is a higher possibility to allow a specific node cluster 12 corresponding to the specific cluster identifier to investigate the cause of the error clearly (for example, the cause may be made clear without investigating other node clusters 12). The second group GD2 may be associated with one cluster identifier or more different from the above one specific cluster identifier or more associated with the first group GD1.

B5. Altogether Breaking Item GE:

The altogether breaking item GE (FIG. 9) is related to a group of a plurality of IP addresses where the always-on connections broke altogether in the past. If a network device malfunctions in processing communications from a plurality of IP addresses (such as a rooter, a gateway, or the like), then the always-on connections with the plurality of IP addresses will break altogether. Then, if the network device restores from the malfunction, then the server system 100 will receive all requests together for establishing the always-on connections from the plurality of IP addresses.

The altogether breaking item GE is selected, for example, from a first group GE1 and a second group GE2. The first group GE1 is a group of the plurality of IP addresses where the always-on connections broke altogether in the past. The second group GE2 is a group of the IP addresses not included in the first group GE1. The condition of the altogether breaking for the IP addresses to be included in the first group GE1 may vary. For example, the condition of the altogether braking may be such that the always-on connections broke off a predetermined threshold number (100, for example) or more of the IP addresses in the past within a predetermined time period (such as 10 minutes).

In the step S520 of FIG. 4, the processing part 40p of the selection server 40 acquires the information used to determine the altogether breaking item GE from the control server 50, according to the process of FIG. 11B. In the step S750, the processing part 40p of the selection server 40 sends data indicating the IP addresses of the terminal devices to the control server 50. In the step S760, the processing part 50p of the control server 50 refers to the always-on connection history data 502 (FIG. 1), and generates a list of the plurality of IP addresses satisfying the condition of the altogether breaking. The processing part 50p sends data indicating whether or not the IP addresses of the terminal devices are included in the list to the selection server 40. The processing part 40p of the selection server 40 refers to the data from the control server 50, and determines the altogether breaking item GE.

The rule for determining the cluster label data 301 (FIG. 2) related to the altogether breaking item GE may be, for example, the following rule RE1. The rule RE1 associates the first group GE1 with a plurality of cluster identifiers. The reason is stated as follows. The network device may malfunction again after a restoration. If the network device restores from the malfunction happening again, then then the server system 100 may receive all requests together for establishing the always-on connections from the plurality of IP addresses included in the first group GE1. If the cluster label data 301 is determined according to the rule RE1, then it is possible to disperse the requests for establishing the always-on connections from the plurality of IP addresses on a plurality of node clusters 12. The second group GE2 may be associated with one cluster identifier or more different from the cluster identifiers associated with the first group GE1.

B6. Communication Failure Item GF:

The communication failure item GF (FIG. 9) is related to a group of a plurality of terminal devices where communication failure happened in the past. The plurality of terminal devices may be used in the same area. For example, the plurality of terminal devices may be used in the same destination. Further, the plurality of terminal devices may be provided by a seller and used in a business area of the seller. The plurality of terminal devices used in the same area may be more likely to undergo breaking of the always-on connections. For example, the network in the area of destination may be unstable. The network in the business area of the seller may be unstable.

The communication failure item GF is selected, for example, from a first group GF1 and a second group GF2. The first group GF1 is a group where communication failure is more likely to happen. The second group GF2 is a group of the terminal devices not included in the first group GF1. In the second embodiment, the identifiers for the plurality of terminal devices are divided in advance into a plurality of groups (also referred to as terminal groups). One terminal group is formed by an identifier for a plurality of terminal groups used in the same area. The areas differ from each other between the plurality of terminal groups. That is, their geographical places are different from each other. A failure group refers to a noticed terminal group included in the first group GF1. The condition of the failure group may vary in terms of indicating that the communication failure is more likely to happen. For example, the condition of the failure group may be such that the always-on connections broke in the past with a predetermined ratio (30%, for example) or more of terminal devices among the plurality of terminal devices included in the noticed terminal group within a predetermined time period (such as 10 minutes).

In the step S520 of FIG. 4, the processing part 40p of the selection server 40 acquires the information used to determine the communication failure item GF from the control server 50, according to the process of FIG. 11B. In the step S750, the processing part 40p of the selection server 40 sends data indicating the identifiers for the terminal devices to the control server 50. In the step S760, the processing part 50p of the control server 50 refers to the always-on connection history data 502 (FIG. 1), and extracts terminal groups satisfying the condition of the failure group from a predetermined plurality of terminal groups. The processing part 50p sends data indicating whether or not the identifiers for the terminal devices are included in the terminal groups satisfying the condition of the failure group to the selection server 40. The processing part 40p of the selection server 40 refers to the data from the control server 50, and determines the communication failure item GF.

The rule for determining the cluster label data 301 (FIG. 2) related to the communication failure item GF may be selected, for example, from two rules RF1 and RF2. The first rule RF1 associates the first group GF1 with a plurality of cluster identifiers. The reason is stated as follows. In an area where communication failure happens, the communication failure may happen again. If the system restores from the communication failure happening again, then the server system 100 may receive all requests together for establishing the always-on connections from the plurality of terminal devices of the terminal group included in the first group GF1. If the first rule RF1 is adopted, then it is possible to disperse the requests for establishing the always-on connections from the plurality of terminal devices on a plurality of node clusters 12. The second group GF2 may be associated with one cluster identifier or more different from the cluster identifiers associated with the first group GF1.

The second rule RF2 associates a different cluster identifier with each group of the communication failure item GF. According to this configuration, if the communication failure happens in a terminal group included in the first group GF1, then the influence of the communication failure on the node cluster 12 associated with the second group GF2 is eased.

Note that the communication failure item GF may be determined by using the IP addresses instead of the identifiers for the terminal devices.

B7. Area Item GG:

The area item GG (FIG. 9) was explained with FIG. 3 earlier on. The area item GG is related to connection sources of the always-on connection. The area item GG may be selected from a plurality of areas including a first area GG1, a second area GG2, and a third area GG3.

In the step S520 of FIG. 4, the processing part 40p of the selection server 40 refers to the terminal information data included in the determination request received in the step S120 (FIG. 3), and acquires the information (the identifiers for the terminal devices in this case) used to determine the area item GG. Instead of that, the processing part 40p may acquire the information from the control server 50 according to the process of FIG. 11B. In the step S750, the processing part 40p of the selection server 40 sends data indicating the information about the terminal devices (for example, the identifiers, IP addresses, and the like) to the control server 50. In the step S760, the processing part 50p of the control server 50 uses the information about the terminal devices to send data indicating the information of the areas associated with the terminal devices to the selection server 40. The corresponding relation between the information about the terminal devices and the areas is predetermined. The processing part 40p of the selection server 40 refers to the data from the control server 50, and determines the area item GG.

The rule for determining the cluster label data 301 (FIG. 2) related to the area item GG may be, for example, the following rule RG1. The rule RG1 associates each area of the area item GG with a different cluster identifier. According to this configuration, if the communication failure happens in one area, then the influence of the communication failure on the node cluster 12 associated with another area is eased. Note that the area item GG may be determined on the basis of various other kinds of information related to the area than the destination of the terminal devices, such as the IP addresses of the terminal devices, business area of the seller providing the terminal devices, and the like.

B8. User Item GH:

The user item (FIG. 10) indicates a user associated with the terminal device. The user is, for example, the owner of the terminal device. The user item GH may be selected from a plurality of user identifiers including a first user identifier GH1 and a second user identifier GH2.

In the step S520 of FIG. 4, the processing part 40$p$ of the selection server 40 acquires the information used to determine the user item GH from the control server 50, according to the process of FIG. 11B. In the step S750, the processing part 40$p$ of the selection server 40 sends data indicating the identifier for the terminal device to the control server 50. In the step S760, the processing part 50$p$ of the control server 50 refers to the user corresponding relation data 503 (FIG. 1), and acquires the user identifier associated with the identifier for the terminal device. The processing part 50$p$ sends data indicating the user identifier to the selection server 40. The processing part 40$p$ of the selection server 40 refers to the data from the control server 50, and determines the user item GH.

The rule for determining the cluster label data 301 (FIG. 2) related to the user item GH may be selected, for example, from two rules RH1 and RH2. The first rule RH1 associates each user identifier with one cluster identifier. If a plurality of terminal devices are associated with one user identifier, then the plurality of terminal devices are associated with the same one cluster identifier. According to this configuration, if some problem happens in one node cluster 12, then it is possible to reduce the number of users influenced by the problem. Note that one cluster identifier may be associated with a plurality of user identifiers.

The second rule RH2 associates each user identifier with a plurality of cluster identifiers. If a plurality of terminal devices are associated with one user identifier, then the second rule RH2 serves for dispersing the plurality of terminal devices on a plurality of node clusters 12. In the step S670 of FIG. 5, the processing part 30$p$ of the cluster administration server 30 determines one target node cluster (that is, one target connection processing part) by way of round-robin according to each user identifier. In this case, the step S665 may be omitted. If the second rule RH2 is used, then it is less possible that all terminal devices associated with one user identifier become not usable due to some problem of one node cluster 12.

B9. User Usage Frequency Item GI:

The user usage frequency item GI (FIG. 10) indicates the group of service usage frequency F3 for each user identifier. The user usage frequency item GI is selected, for example, from a first group GI1 (the service usage frequency F3 is equal to or more than a predetermined threshold value F3th) and a second group GI2 (the service usage frequency F3 is less than the predetermined threshold value F3th).

In the step S520 of FIG. 4, the processing part 40$p$ of the selection server 40 acquires the information used to determine the user usage frequency item GI from the service server 70, according to the process of FIG. 11A. In the step S710, the processing part 40$p$ of the selection server 40 sends data indicating the identifier for the terminal device to the service server 70. In the step S720, the processing part 70$p$ of the service server 70 refers to the service corresponding relation data 701, and acquires the user identifier associated with the identifier for the terminal device. The processing part 70$p$ refers to the history data 702, and information about the user usage frequency item GI from the history of using the service associated with the identifier for the terminal device (for example, the total times of using all services, and the days from starting use of the first service to the present). Then, the processing part 70$p$ sends data indicating the prepared information to the selection server 40. The processing part 40$p$ of the selection server 40 refers to the data from the service server 70, calculates the service usage frequency F3, and determines the user usage frequency item GI (For example, F3=the total times of usage/days).

The rule for determining the cluster label data 301 (FIG. 2) related to the user usage frequency item GI may be, for example, the following rule RI1. The rule RI1 associates the first group GI1 with one specific cluster identifier or more. The second group GI2 is associated with one cluster identifier or more not included in the one specific cluster identifier or more associated with the first group GI1. The connection processing part 10 associated with the specific cluster identifier provides the always-on connection of a higher quality than the other connection processing parts 10. According to this configuration, if a user having a high service usage frequency F3 uses a new terminal device, then there is a lower possibility of causing a problem in the node cluster 12 due to the load of the always-on connection of that terminal device.

B10. Model Item GJ

The model item GJ (FIG. 10) was that explained earlier on with FIG. 3. The model item GJ may be selected, for example, from a plurality of models including the first model GJ1 and the second model GJ2.

In the step S520 of FIG. 4, the processing part 40$p$ of the selection server 40 refers to the terminal information data included in the determination request received in the step S120 (FIG. 3), and acquires the information (the model name in this case) used to determine the model item GJ. Instead of that, the processing part 40$p$ may acquire the information from the control server 50 according to the process of FIG. 11B. In the step S750, the processing part 40$p$ of the selection server 40 sends data indicating the information about the terminal devices (for example, the identifiers, IP addresses, and the like) to the control server 50. In the step S760, the processing part 50$p$ of the control server 50 uses the information about the terminal devices to send data indicating the models of the terminal devices to the selection server 40. The corresponding relation between the information about the terminal devices and the models is predetermined. The processing part 40$p$ of the selection server 40 refers to the data from the control server 50, and determines the model item GJ.

The rule for determining the cluster label data 301 (FIG. 2) related to the model item GJ may be, for example, the following rule RJ1. The rule RJ1 associates each model of the model item GJ with a different cluster identifier. Here, between the plurality of models, the functions of the terminal devices may differ (especially, the functions for the always-on connection). For example, the communication protocols for the always-on connection may differ between the plurality of models. In this case, each node cluster 12 is configured to have a function fitting the function of the terminal device of the corresponding model. In this manner, the plurality of node clusters 12 may have different functions from each other. Then, each model of the model item GJ may be associated with the node cluster 12 having the function fitting for the model.

B11. Version Item GK:

The version item GK (FIG. 10) indicates a version of firmware of the terminal device. The version item GK may be selected, for example, from a plurality of versions including a first version GK1 and a second version GK2.

In the step S520 of FIG. 4, the processing part 40p of the selection server 40 refers to the terminal information data included in the determination request received in the step S120 (FIG. 3), and acquires the information (the version of firmware in this case) used to determine the version item GK.

The rule for determining the cluster label data 301 (FIG. 2) related to the version item GK may be, for example, the following rule RK1. The rule RK1 associates each version of the version item GK with a different cluster identifier. Here, between the plurality of versions, the functions of the terminal devices may differ (especially, the functions for the always-on connection). For example, the communication protocols for the always-on connection may differ between the plurality of versions. In this case, each node cluster 12 is configured to have a function fitting the function of the terminal device of the corresponding version. In this manner, the plurality of node clusters 12 may have different functions from each other. Then, each version of the version item GK may be associated with the node cluster 12 having the function fitting for the version.

Note that the label information may be a combination of any items more than one selected from the above items GA to GK. Here, the options for each item (such as the first group GB1, the second group GB2 and the like of the printing frequency item GB (FIG. 8)) may be associated with a cluster identifier according to the rule for the above corresponding item. The allocation label information 401 (FIG. 1) may be predetermined to indicate the configuration of the label information (for example, the list of items included in the label information). However, the rules for determining the cluster label data 301 are not limited to those of FIGS. 8 to 10, but may be various other rules. For example, regardless of the item contents, each option for an item may be associated with a different cluster identifier.

C. Third Embodiment

The server system 100 (FIG. 1) may reallocate a node cluster 12 to the terminal device. FIG. 12 is a flow chart depicting an example of allocation update process. In the step S780, the processing part 50p of the control server 50 determines whether or not a reallocation condition is satisfied. The reallocation condition may be an arbitrary one indicating that it is preferable to reallocate the node cluster 12. For example, the reallocation condition may be such that an elapsed time since the last reallocation reaches a predetermined temporal threshold value or more. If the reallocation condition is not satisfied (S780: No), then the processing part 50p repeats the step S780 and waits for the reallocation condition to be satisfied. If the reallocation condition is satisfied (S780: Yes), then the processing part 50p carries out a reallocation process in the step S790 for the node cluster 12. For example, the processing part 50p may send a command to acquire a cluster URL to the terminal device via the connection processing part 10. The terminal device carries out the process of the step S180 of FIG. 3 according to the command. After the step S180, the process of the steps S190 to S240 is carried out. By virtue of this, the terminal device acquires a new cluster URL and uses the new cluster URL to reestablish the always-on connection. As a result, a new node cluster 12 is allocated to the terminal device. For example, based on the newest history about the terminal device, a node cluster 12 different from the node cluster 12 allocated in the past may be allocated to the terminal device. After the step S790, the process returns to the step S780.

Note that in order to avoid too many requests for the establishment from reaching to the server system 100, the processing part 50p may carry out the reallocation process (S790) at a different time for each terminal device. For example, the processing part 50p may repeat the reallocation process for one terminal device over a predetermined interval of time. Further, the processing part 50p may carry out the allocation update process for each terminal device. In this case, the condition for reallocation may differ for each terminal device.

D. Fourth Embodiment

It is allowable to change the configuration of the allocation label information to be allocated to the terminal device in the step S130 of FIG. 3. FIG. 13 is a flow chart depicting an example of processing for changing the configuration of the allocation label information. In the step S810, the administrator of the server system 100 (FIG. 1) operates on an undepicted operating unit (such as a touch panel, buttons, and the like) of the administration terminal 80 to input information indicating a new configuration. For example, the configuration of the allocation label information may combine items more than one selected arbitrarily from the items GA to GK of FIGS. 8 to 10. In the step S820, the processing part 80p of the administration terminal 80 sends data indicating the new configuration to the selection server 40. In the step S830, the processing part 40p of the selection server 40 causes the nonvolatile storage device 40n to store the allocation label configuration data 401 indicating the new configuration expressed by the received data. Then, the process of FIG. 13 is ended. After updating the allocation label configuration data 401, the processing part 40p refers to the updated allocation label configuration data 401 in the step S130 (FIG. 3) to determine the allocation label information. In the fourth embodiment, the administrator can change the allocation label configuration data 401 according to the condition of using the server system 100. For example, after starting operation of the server system 100, there are cases where the frequency of errors of API becomes high. In such cases, the administrator may add the error frequency item GD (FIG. 9) to the configuration of the allocation label information.

The cluster label data 301 (FIG. 2) may predetermine a corresponding relation between all usable items. Instead of that, the processing part 30p of the cluster administration server 30 may allow the user to change the cluster label data 301. The processing part 30p may change the cluster label data 301, for example, by the same process as that of FIG. 13. The administrator inputs the label information of each of the plurality of cluster identifiers to the administration terminal 80. The processing part 80p of the administration terminal 80 sends to the cluster administration server 30 data indicating a corresponding relation between the label information and the cluster identifiers. The processing part 30p of the cluster administration server 30 causes the nonvolatile storage device 30n to store the cluster label data 301 indicating the corresponding relation expressed by the received data. Note that the administrator may add a new connection processing part 10 to the server system 100.

Then, the administrator may allocate the label information to the new connection processing part 10 by changing the cluster label data 301.

E. Modifications (1) The label information may include various kinds of information. For example, the label information may include terminal specification information related to the specifications of terminal devices. The model item GJ (FIG. 10) and the version item GK are an example of the terminal specification information. Various other kinds of information may be adopted as the terminal specification information (such as the number of types of color materials usable for printing, resolution of reader devices, details of the function of terminal devices, and the like). The controller 5 can use one piece or more of the above information including the terminal specification information for determining a target node cluster (FIG. 3: the steps S120 to S160), to appropriately disperse a plurality of terminal devices on a plurality of connection processing parts 10 according to the specifications of each terminal device.

The label information may include user information associated with the user of a terminal device. The user item GH (FIG. 10) and the user usage frequency item GI are an example of the user information. Various other kinds of information may be adopted as the user information (such as the ages of users, the language setting for terminal devices, and the like). The controller 5 can use one piece or more of the above information including the user information for determining a target node cluster (FIG. 3: the steps S120 to S160), to appropriately disperse a plurality of terminal devices on a plurality of connection processing parts 10 according to the user attribution indicated by the user information.

The label information may include service information related to the usable service for the terminal devices. The service item GA (FIG. 8) and the printing frequency item GB are an example of the service information. Various other kinds of information may be adopted as the service information (such as the reading frequency of reader devices, and the like). The controller 5 can use one piece or more of the above information including the service information for determining a target node cluster (FIG. 3: the steps S120 to S160), to appropriately disperse a plurality of terminal devices on a plurality of connection processing parts 10 according to the usable service.

The label information may include history information related to communication history of terminal devices. The communication frequency item GC (FIG. 8), the error frequency item GD (FIG. 9), the altogether breaking item GE, and the communication failure item GF are an example of the history information. Various other kinds of information may be adopted as the history information (such as the total number of breaks of the always-on connection, and the like). The controller 5 can use one piece or more of the above information including the history information for determining a target node cluster (FIG. 3: the steps S120 to S160), to appropriately disperse a plurality of terminal devices on a plurality of connection processing parts 10 according to the communication history.

(2) In the step S520 of FIG. 4, the process of acquiring the information used to determine the allocation label information may be various other processes instead of the process of referring to the terminal information data included in the determination request of the step S120 (FIG. 3), and the process of FIGS. 11A and 11B. For example, the processing part 40*p* of the selection server 40 may acquire information (such as information related to the terminal device) from the terminal device being the source of sending the registration request of the step S110 (FIG. 3). Further, the processing part 40*p* may acquire information (such as information related to communication history of the always-on connection) from the load balancer 11 of the connection processing part 10.

(3) The status information used in the steps S665 and S670 of FIG. 5 is not limited to the number of always-on connections having established with the connection processing parts 10, but may indicate various states of the connection processing parts 10. For example, the status information may indicate the load of a connection processing part 10. The load of the connection processing part 10 may be, for example, a combination of total usage rate of the CPU and total usage rate of the memory. The total usage rate of the CPU may take a variety of values calculated by using the usage rate of the CPU of each of the plurality of nodes 13 included in the node clusters 12 of the connection processing parts 10. The total usage rate of the CPU may take, for example, a representative value (such as average value, a mode value, a median value, or the like). The total usage rate of the memory may take a variety of values calculated by using the usage rate of the memory of each of the plurality of nodes 13 included in the node clusters 12 of the connection processing parts 10. The total usage rate of the memory may also take, for example, a representative value (such as an average value, a mode value, a median value, or the like).

In the step S670, the processing part 30*p* selects one connection processing part 10 (that is, one node cluster 12) such that there may be less bias in the load between the N numbers of candidate clusters. For example, the processing part 30*p* may select from the N numbers of candidate clusters a candidate cluster having the minimum total usage rate of the CPU and the minimum total usage rate of the memory. If the candidate cluster having the minimum total usage rate of the CPU is different from the candidate cluster having the minimum total usage rate of the memory, then the candidate cluster having the minimum total usage rate of the memory may be selected.

Likewise, in the step S230 of FIG. 3, the processing part 11*p* of the load balancer 11 may select one node 13 such that there may be less bias in the load between the plurality of nodes 13 of the node cluster 12. For example, the processing part 11*p* may select from the plurality of nodes 13 a node 13 having the minimum usage rate of the CPU and the minimum usage rate of the memory. If the node 13 having the minimum usage rate of the CPU is different from the node 13 having the minimum usage rate of the memory, then the node 13 having the minimum usage rate of the memory may be selected.

(4) The process for establishing the always-on connection may be any of various other processes instead of the process of FIG. 3. For example, the first request for determining one connection processing part 10 to establish the always-on connection with the terminal device may be any of various other requests instead of the registration request for the terminal device (FIG. 3: S110). Further, the second request for establishing the always-on connection may be any of various other requests instead of the establishment request for the always-on connection (FIG. 3: S220).

The destination data may be sent at any timing after determining one connection processing part 10 to establish the always-on connection with the terminal device (FIG. 3: S160). For example, the processing part 30*p* of the cluster administration server 30 may send a notification including the destination data to the control server 50. Then, the processing part 50*p* of the control server 50 may send the notification including the destination data to the terminal device according to the receipt of the notification of the step S170. In this case, the steps S180 to S210 may be omitted, and the destination indicated by the destination data may be any information indicating the destination on the network such as an IP address or the like, instead of the URL.

In the step S670 of FIG. 5, the processing part 30*p* of the cluster administration server 30 may select one node cluster 12 from the N numbers of candidate clusters by way of round-robin without using the status information. In this case, the step S665 may be omitted.

(5) In the above respective embodiments, the label information is used to determine one connection processing part 10 to establish the always-on connection with the terminal device (FIG. 3: the steps S120 to S160). In particular, in the process of determining the connection processing part 10 (the steps S120 to S160), the allocation label information is used instead of detailed information about the terminal device. Therefore, compared to a case of using the detailed information about the terminal device, it is possible to configure the determining process readily. Further, by changing the allocation label information allocated to the terminal device or the label information assigned to the connection processing part 10, it is possible to readily change the corresponding relation between the terminal device and the connection processing part 10. Note that the allocation label information may be associated with a plurality of connection processing parts 10. Instead of that, the allocation label information may also be associated with one connection processing part 10.

(6) It is possible to determine one connection processing part 10 to establish the always-on connection with the terminal device, without using the label information. For example, the step S160 (FIG. 3) may be configured to let the processing part 30*p* of the cluster administration server 30 use detailed information about the terminal device to select the connection processing part 10, without using the label information.

Further, the processing part 30*p* may select a connection processing part 10 to reduce the bias in the load between a plurality of connection processing parts 10 or the bias in the number of always-on connections between the plurality of connection processing parts 10, without using the information about the terminal device. For example, in the step S160 (FIG. 3), the processing part 30*p* may carry out the process of the steps of S665 and S670 (FIG. 5). The steps S610 to S660 are omitted. Further, the steps S120 to S140 of FIG. 3 are omitted.

Further, the processing part 30*p* may select a connection processing part 10 by way of round-robin, without using the information about the terminal device, the load of the connection processing parts 10, and the number of always-on connections of the connection processing parts 10.

Further, the processing part 30*p* may be configured to select in the step S160 (FIG. 3) the same connection processing part 10 for a plurality of terminal devices satisfying a predetermined specific condition. Here, the specific condition may be any condition such as, for example, a condition belonging to preselected options for the terminal device to preselect items from the aforementioned items GA to GK (FIGS. 8 to 10).

(7) The server system for the always-on connection may be configured in any other way than is the server system 100 of FIG. 1. For example, the load balancer 11 may be omitted from the connection processing part 10. Here, in the step S230 (FIG. 3), one node 13 may be selected by any method. For example, among the plurality of nodes 13 included in the node cluster 12, based on agreement, one node 13 may be selected for the always-on connection.

The node 13 may be constructed of a dedicated hardware circuit such as an ASIC (Application Specific Integrated Circuit) or the like instead of a computer. Likewise, other devices of the server system 100 (such as the devices 11, 20, 30, 40, and 50) may also be each constructed of a dedicated hardware circuit.

The controller 5 controlling the plurality of connection processing parts 10 may be configured in any other way than is that of FIG. 1. For example, the cluster administration server 30 may have the function of the administration load balancer 20, and the administration load balancer 20 may be omitted. Further, the control server 50 may have the function of the selection server 40, and the selection server 40 may be omitted. Further, the controller 5 may be constructed from one server device or more. The controller 5 may include a plurality of devices (such as computers) capable of communication with each other via a network.

In the above respective embodiments, part of the configuration realized by hardware may be replaced by software. Conversely, part of or the entire of the configuration realized by software may be replaced by hardware.

Further, if part of or the entire of the function of the present teaching is realized by a computer program, then that program can be provided in the form of being stored in a computer readable recording medium (such as a non-temporary recording medium). The program may be used in a state of being stored in a recording medium (a computer readable recording medium) which is identical to or different from that on provision. The "computer readable recording medium" is not limited to portable recording media such as memory cards and CD-ROMs, but may include internal storage devices in a computer such as various ROMs and the like, external storage devices connected to a computer such as hard disk drives, and the like.

Hereinabove, the present teaching was explained on the basis of the embodiments and modifications. However, the above embodiments and modifications of the present teaching are configured to facilitate comprehension of the present teaching but not to limit the present teaching. The present teaching may be changed and/or improved without departing from the true spirit thereof and, at the same time, the equivalences thereof are included in the present teaching.

What is claimed is:

1. A server system for an always-on connection, comprising:
    a plurality of always-on connection processing parts; and
    a controller including a control server and a selection server,
    wherein each of the always-on connection processing parts includes a plurality of always-on connection execution parts,
    the controller is configured to execute:
        a receiving process to receive a first request from a terminal device;
        a determining process to determine a target always-on connection processing part, among the always-on connection processing parts according to the first request, the target always-on connection processing part being one always-on connection processing part to establish the always-on connection with the terminal device; and
        a sending process to send to the terminal device a destination data indicating a destination of a second request different from the first request for the always-on connection after determining the target always-on connection processing part, the destination data also indicating the target always-on connection processing part, and the target always-on connection processing part is configured to establish the always-on connection between the terminal device and one always-on connection execution part among the always-on connection execution parts included in the target always-on connection processing part, according to the second request from the terminal device, the processing part of the control server sends to the selection server a determination request for the allocation label information to be all to the terminal device, wherein the control server stores and utilizes API history data, always-on connection history data, and user corresponding relation data, wherein the selection server refers to the allocation label configuration data and acquires an allocation label configuration which is the configuration of the allocation label information;

wherein label information based on at least one of service information, user information, or terminal specification information is assigned in advance to each of the always-on connection processing parts, and in the determining process, the controller is configured to execute:
  an allocation label determining process to determine allocation label information, the allocation label information being the label information to be allocated to the terminal device, wherein the label information includes at least one information type selected from service information, history information, user information and terminal specification information; and
  a processing part determining process to determine an always-on connection processing part to which the allocation label information is assigned as the target always-on connection processing part, among the always-on connection processing parts.

2. The server system according to claim 1, wherein the controller is configured to determine the target always-on connection processing part in the determining process by using one piece or more of information including the terminal specification information, the terminal specification information being information related to specifications of the terminal device.

3. The server system according to claim 1, wherein the controller is configured to determine the target always-on connection processing part in the determining process by using one piece or more of information including the user information, the user information being information associated with a user of the terminal device.

4. The server system according to claim 1, wherein the controller is configured to determine the target always-on connection processing part in the determining process by using one piece or more of information including status information indicating a state of each of the always-on connection processing parts.

5. The server system according to claim 1, wherein the controller is configured to determine the target always-on connection processing part in the determining process by using one piece or more of information including the service information related to a service usable in the terminal device.

6. The server system according to claim 1, wherein the controller is configured to determine the target always-on connection processing part in the determining process by using one piece or more of information including history information related to a communication history of the terminal device.

7. The server system according to claim 1, wherein in the processing part determining process, the controller is configured to determine the target always-on connection processing part from a plurality of candidate processing parts to each of which the allocation label information is assigned, such that either a bias in a load among the candidate processing parts or a bias in the number of always-on connections among the candidate processing parts is reduced in a case that the always-on connection processing parts include the candidate processing parts.

8. The server system according to claim 1, wherein in the determining process, the controller is configured to determine the target always-on connection processing part, such that either a bias in a load among the always-on connection processing parts or a bias in the number of always-on connections among the always-on connection processing parts is reduced.

9. The server system according to claim 1, wherein in the determining process, the controller is configured to determine the same always-on connection processing part as the target always-on connection processing part for a plurality of terminal devices satisfying a predetermined condition.

10. The server system according to claim 1, wherein
  each of the always-on connection processing parts includes a load balancer configured to distribute the second request received by the always-on connection processing part to the always-on connection execution parts, and
  the destination data indicates the load balancer included in the target always-on connection processing part.

* * * * *